US008918455B2

(12) United States Patent
Vilke et al.

(10) Patent No.: US 8,918,455 B2
(45) Date of Patent: *Dec. 23, 2014

(54) SYSTEMS AND ALGORITHM FOR INTERFACING WITH A VIRTUALIZED COMPUTING SERVICE OVER A NETWORK USING A LIGHTWEIGHT CLIENT

(71) Applicant: Citrix Systems, Inc., Fort Lauderdale, FL (US)

(72) Inventors: Stephen D. Vilke, Danville, CA (US); Peter Badger, San Anselmo, CA (US); Dan Roncadin, San Francisco, CA (US); Rudy Willis, Clayton, CA (US); James Selvidge, Berkeley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/786,417

(22) Filed: Mar. 5, 2013

(65) Prior Publication Data

US 2013/0268580 A1     Oct. 10, 2013

Related U.S. Application Data

(63) Continuation of application No. 12/784,468, filed on May 20, 2010, now Pat. No. 8,392,497.

(60) Provisional application No. 61/264,654, filed on Nov. 25, 2009.

(51) Int. Cl.
| | | |
|---|---|---|
| *G06F 15/16* | (2006.01) | |
| *G06F 9/44* | (2006.01) | |
| *G06F 15/163* | (2006.01) | |
| *H04L 29/06* | (2006.01) | |
| *G06F 9/54* | (2006.01) | |
| *G06F 9/455* | (2006.01) | |

(52) U.S. Cl.
CPC .............. *H04L 67/42* (2013.01); *G06F 9/4445* (2013.01); *G06F 2009/45595* (2013.01); *G06F 15/163* (2013.01); *G06F 9/54* (2013.01); *G06F 9/45558* (2013.01)
USPC ........... 709/203; 709/202; 709/217; 709/222; 709/228; 709/237; 709/246

(58) Field of Classification Search
USPC .......... 709/202, 203, 217, 222, 228, 237, 246
See application file for complete search history.

(56) References Cited

U.S. PATENT DOCUMENTS

| | | | | |
|---|---|---|---|---|
| 8,200,796 B1 * | 6/2012 | Margulis | ....................... | 709/223 |
| 8,392,497 B2 * | 3/2013 | Vilke et al. | .................... | 709/202 |

(Continued)

*Primary Examiner* — Michael Y Won
(74) *Attorney, Agent, or Firm* — Finnegan, Henderson, Farabow, Garrett & Dunner LLP

(57) ABSTRACT

Systems and algorithm for providing a service to a client includes defining a virtual infrastructure in which a plurality of virtual machines are running on a virtualization layer with at least one of the virtual machine executing an image processor algorithm. The image processor algorithm is configured to access framebuffer data of a specific virtual machine that includes the service to be controlled, process the framebuffer data to generate image data packets with contextual information by scanning the framebuffer data to discern the image of the virtual machine display, evaluate the framebuffer data to identify contiguous areas of activity, extract data related to the contiguous areas of activity and package the extracted data into image data packets. The image data packets are transmitted to the client for presenting on a display device of the client.

20 Claims, 22 Drawing Sheets

(56) References Cited

U.S. PATENT DOCUMENTS

| | | | |
|---|---|---|---|
| 8,676,949 B2* | 3/2014 | Vilke et al. | 709/223 |
| 2010/0306413 A1* | 12/2010 | Kamay | 709/247 |
| 2010/0306773 A1* | 12/2010 | Lee et al. | 718/1 |
| 2011/0126198 A1* | 5/2011 | Vilke et al. | 718/1 |
| 2013/0268580 A1* | 10/2013 | Vilke et al. | 709/203 |
| 2013/0346479 A1* | 12/2013 | Vilke et al. | 709/203 |

* cited by examiner

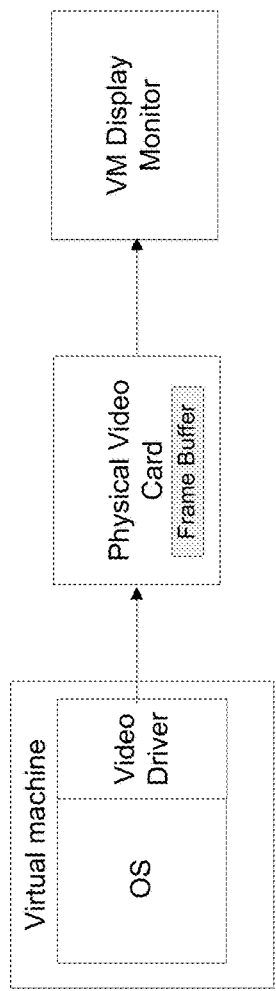
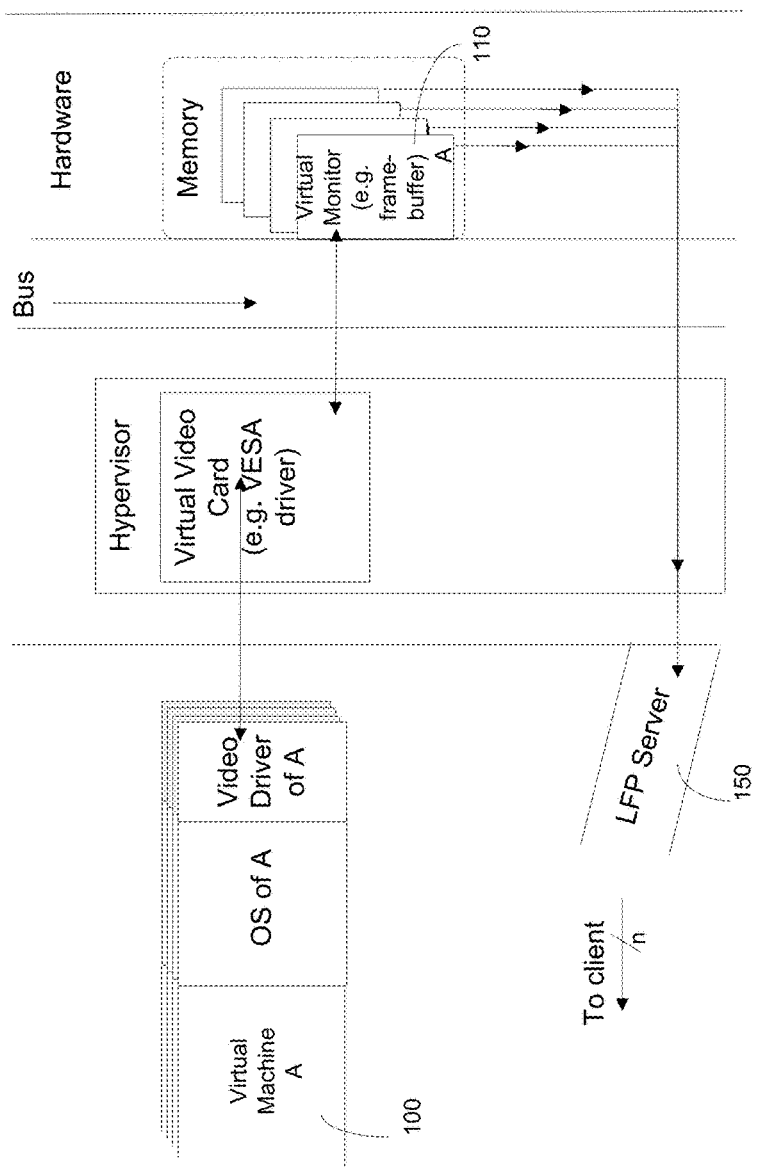
Figure 2A
Figure 2B

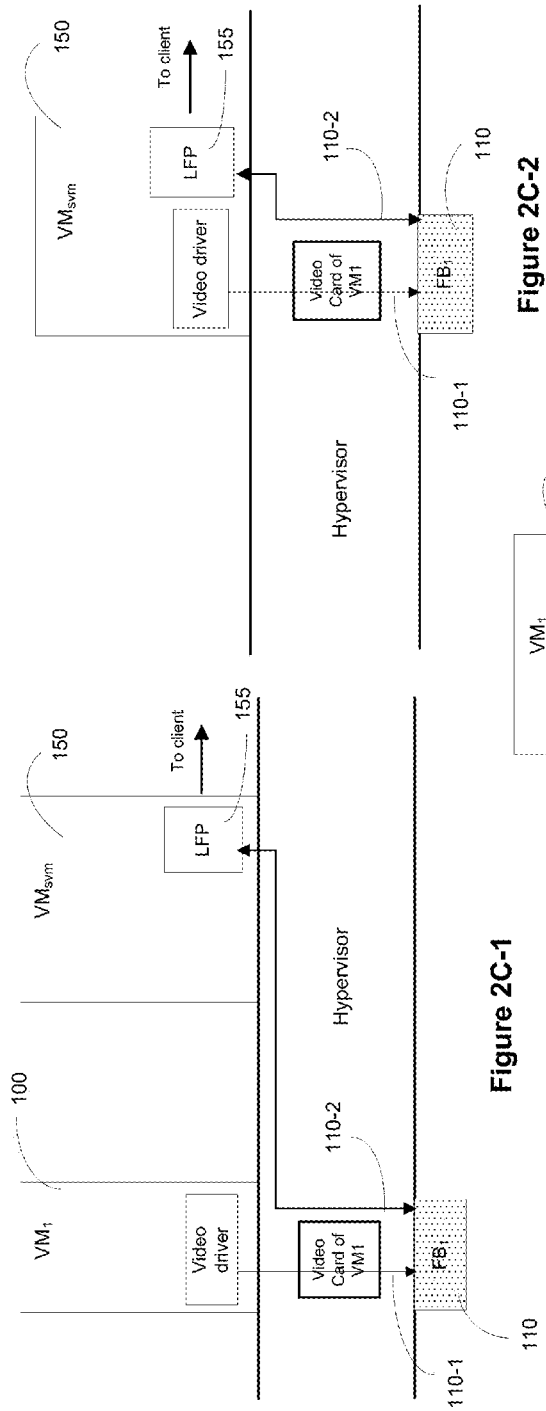
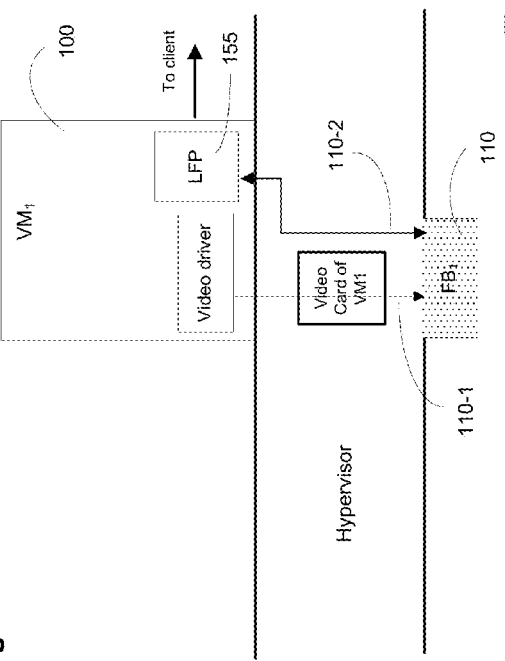
Figure 2C-1
Figure 2C-2
Figure 2C-3

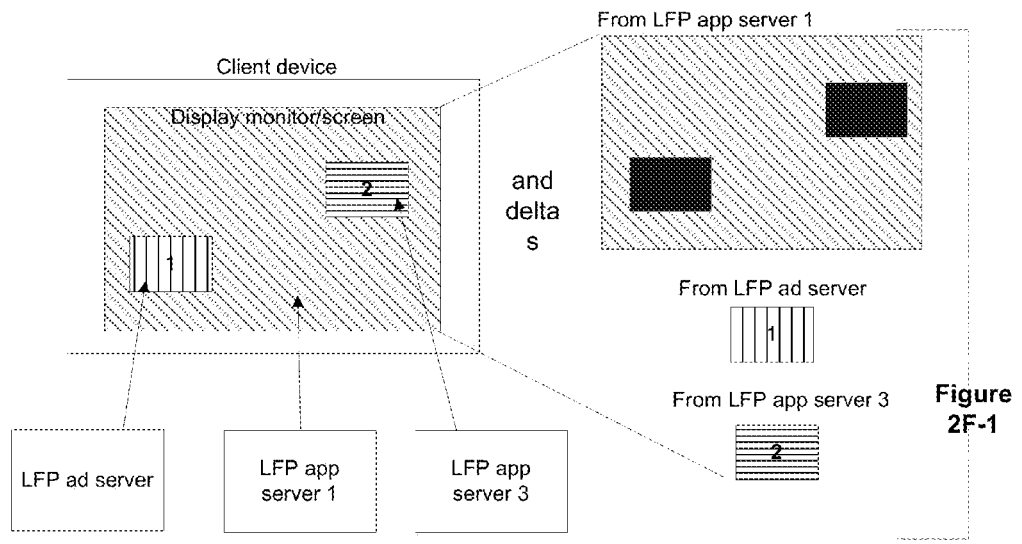
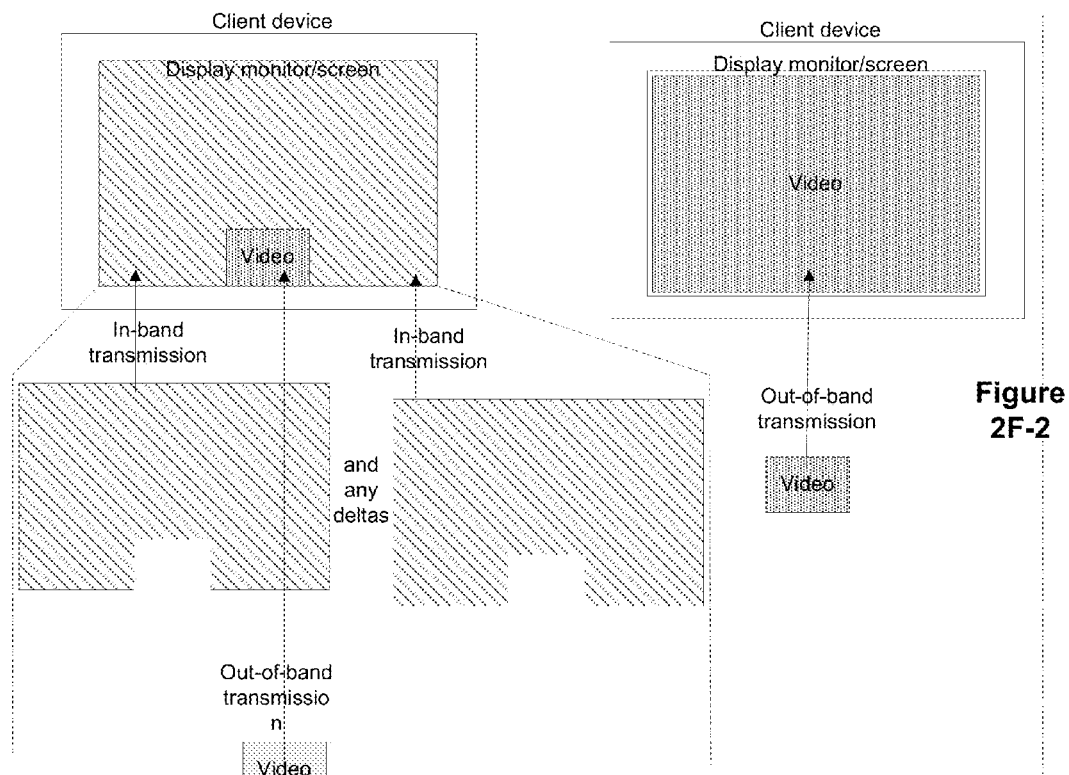
Figure 2F (No change in framebuffer data)

(Small changes in framebuffer data)

(Lot of changes in framebuffer data)

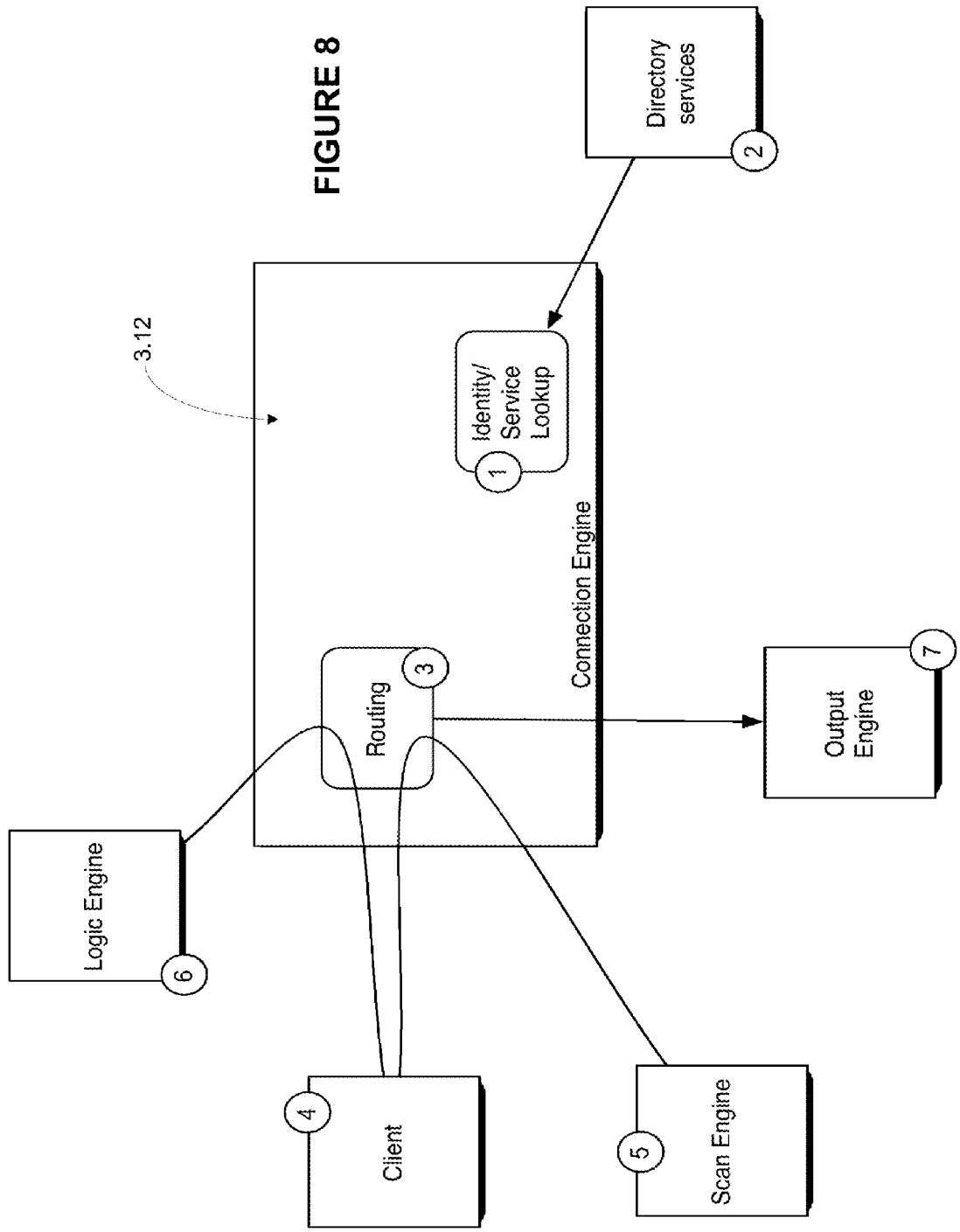

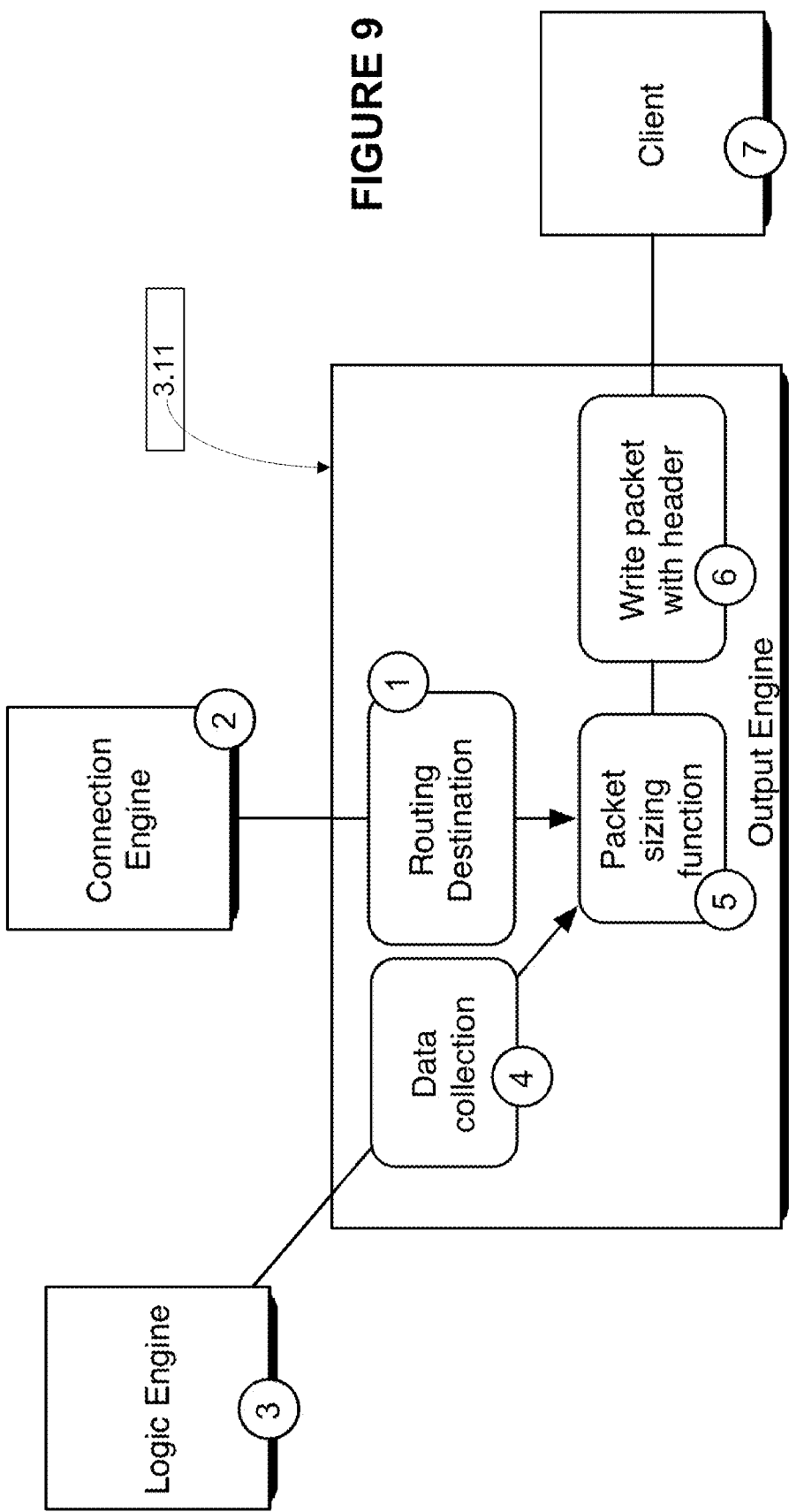

SYSTEMS AND ALGORITHM FOR INTERFACING WITH A VIRTUALIZED COMPUTING SERVICE OVER A NETWORK USING A LIGHTWEIGHT CLIENT

CLAIM OF PRIORITY

This application is a continuation application of U.S. patent application Ser. No. 12/784,468, filed May 20, 2010, and entitled "Systems and Algorithm for Interfacing with a Virtualized Computer Service over a Network using a Lightweight Client," which claimed priority of U.S. Provisional Patent Application No. 61/264,654, filed Nov. 25, 2009, and entitled "An Operating System And Platform-Independent Method For Controlling A Virtualized Computer Service At Long Distances With A Lightweight Client," each of these applications are incorporated herein by reference in their entireties.

CROSS REFERENCE TO RELATED APPLICATION

This application is related to commonly owned U.S. patent application Ser. No. 12/784,454, filed on May 20, 2010, and entitled, "METHODS FOR INTERFACING WITH A VIRTUALIZED COMPUTING SERVICE OVER A NETWORK USING A LIGHTWEIGHT CLIENT," and U.S. application Ser. No. 13/786,419, filed on Mar. 5, 2013, and entitled "Systems and Algorithm for Interfacing with a Virtualized Computer Service over a Network using a Lightweight Client," which are incorporated herein by reference in its entirety.

BACKGROUND

1. Field of the Invention

The present invention relates to methods and systems for accessing, controlling, and interfacing with a virtualized computer service over short and long distances with a lightweight client.

2. Description of the Related Art

In a virtual environment, a virtual resource is remotely accessed and controlled through a combination of hardware and software protocols. The virtual environment includes a plurality of dynamically scalable virtual resources that are provided as services over the Internet and are aptly termed cloud services due to the "clouding" of the underlying technology for accessing such virtual resources. A typical virtual environment can be characterized as a collection of computing hardware, a hypervisor that sits on top of the computing hardware and provides access to the computing hardware and a plurality of guests (Virtual machines or VMs) that sit on top of the hypervisor accessing the hardware through the hypervisor. A plurality of clients are used to connect to and remotely control the virtualized computer services (or simply virtual services) within the virtual environment via protocols. These protocols/derivations of protocols are used in the compression/decompression of the direct graphics stream associated with the VMs, using redundancy elimination and graphic instruction rewrites so as to enable lower bandwidth communication than the original graphics stream.

The above protocols have their own limitations and challenges. A significant limitation is that these protocols are tied to a specific platform or platforms (graphics/operating system layer) requiring the operating system or the graphics chip to be in harmony with the compression/decompression protocol. This means that the compression protocols leverage the "context" of the operating system graphics so that the commands can be interpreted and executed at the remote VMs within the virtual environment. The adverse effects of such platform specific protocols include usage of large CPUs both in the thin client and at the virtual service side for compression/decompression and interpretation of the progressive imagery and difficulty in handling large latency of long distance WAN network connections. Additional disadvantages include requirement of specialized chips (graphics chips) to decode the compression in certain circumstances, and high network consumption in other circumstances.

Additionally, the basis for formulating such platform specific software-based protocols was to drive fast performance through the operating system graphics layer. As a result, the direct interpretation of the operating system graphics commands was critical to the design of such protocol, making their design platform-specific, which carried over into the virtual machine environment. Another drawback of customized protocols is that their complexity makes them incompatible with many lightweight client devices, such as low power thin clients or mobile smartphone-class devices.

It is in this context, embodiments of the invention arise.

SUMMARY OF THE INVENTION

The embodiments of the invention provide a multitude of systems, algorithm and configurations to enable accessing, controlling, and interfacing with a virtualized computer service over short and long distances with lightweight or non-lightweight computing devices. In one embodiment, a system includes a virtual infrastructure in which a virtual machine with a image processor algorithm runs on a virtualization layer, over which a plurality of virtual machines are running. The virtualization layer interacts with the respective operating systems of the virtual machines. The virtual machine equipped with the image processor algorithm is different from the other virtual machines in the virtual infrastructure and the image processor algorithm is configured to access framebuffer data of a specific virtual machine that includes the service to be controlled directly, process the framebuffer data of the specific virtual machine into image data packets and transmit image data packets to the client for presentation and interaction to control the service.

In one embodiment, a system is disclosed for providing a service to a client over a network. The system defines a virtual environment and includes one or more virtual machines that are configured to run on a virtualization layer. At least one of the virtual machines is executing an image processor algorithm. The image processor algorithm includes logic that is configured to access framebuffer data of a specific virtual machine directly from a predetermined location of virtual memory available through the virtualization layer. The specific virtual machine includes the service to be controlled. The framebuffer data defines graphical output representing an image associated with a virtual machine display of the specific virtual machine. The framebuffer data of the specific virtual machine is processed by the image processor algorithm to generate image data packets with contextual information. The image processor algorithm includes logic to scan the framebuffer data of the specific virtual machine to discern the image of the virtual machine display of the specific virtual machine including any changes in the framebuffer data of the specific virtual machine. The image processor algorithm then evaluates the framebuffer data including the changes to identify contiguous areas of activity. The framebuffer data associated with the contiguous areas of activity define one or more frames of data. The algorithm extracts data related to the contiguous areas of activity into one or more frames and packages the extracted data associated with the contiguous areas of activity into image data packets. The image data packets of the specific virtual machine are then transmitted by the algorithm to the client for presenting on a display device associated with the client. Interactions at the client are monitored and used in controlling the service at the specific virtual machine.

In one embodiment, an image processor algorithm available on a computer readable medium is disclosed. The image processor algorithm is configured to provide a service to a client over a network. The image processor algorithm includes programming logic to access framebuffer data of a specific virtual machine directly from a predetermined location of virtual memory available through the virtualization layer. The specific virtual machine includes the service to be controlled. The framebuffer data defines graphical output representing an image associated with a virtual machine display of the specific virtual machine. The image processor algorithm includes programming logic to process the framebuffer data of the specific virtual machine to generate image data packets with contextual information. The programming logic within the image processor algorithm is configured to scan the framebuffer data of the specific virtual machine to discern the image of the virtual machine display of the specific virtual machine including any changes in the framebuffer data of the specific virtual machine. The framebuffer data including the changes are evaluated to identify contiguous areas of activity and to define one or more frames of data. Data related to the contiguous areas of activity are extracted into one or more frames and packaged into image data packets. The algorithm includes programming logic to transmit the image data packets of the specific virtual machine to the client for presenting on a display device associated with the client. The programming logic of the algorithm is further configured to monitor interactions at the client and use the interactions in controlling the service at the specific virtual machine.

The invention will be readily understood by the following detailed description taken in conjunction with the accompanying drawings and claims.

BRIEF DESCRIPTION OF THE DRAWINGS

The present invention will be readily understood by the following detailed description in conjunction with the accompanying drawings.

FIG. 2-1 shows a block diagram of a system used in remotely accessing and controlling a virtualized computer service in a virtual environment, in accordance with an embodiment of the present invention.

FIGS. 2-2 and 2-3 show alternate embodiments of the invention depicted in FIG. 2-1.

FIG. 2A illustrates a simple block diagram of the workings of a conventional video card.

FIG. 2B illustrates a simple block diagram depicting the workings of a hypervisor in accessing virtual image of a monitor associated with a virtual machine, in one embodiment of the invention.

FIGS. 2C-1, 2C-2 and 2C-3 illustrate a simple block diagram of the process of capturing the framebuffer data, in alternate embodiments of the invention.

FIG. 2F illustrates type and form of framebuffer data received and rendered from various sources. FIG. 2F-1 illustrates an embodiment wherein framebuffer data from various sources are received and rendered through in-band communication. FIG. 2F-2 illustrates an embodiment wherein out-of-band framebuffer data is received and rendered at a client's display device.

FIG. 8 illustrates a block diagram defining process flow within a connection engine used in the remote access and control of a computer system, in accordance with an embodiment of the present invention.

FIG. 9 illustrates a block diagram defining process flow within an output engine used in the remote access and control of a computer system, in accordance with an embodiment of the present invention.

FIGS. 12A-1 and 12A-2 illustrate ways for a portable computing device, such as a laptop computer or mobile device, to access a virtualized computer service within a virtual environment through a docking, in one embodiment of the invention.

DETAILED DESCRIPTION

Figure 1:
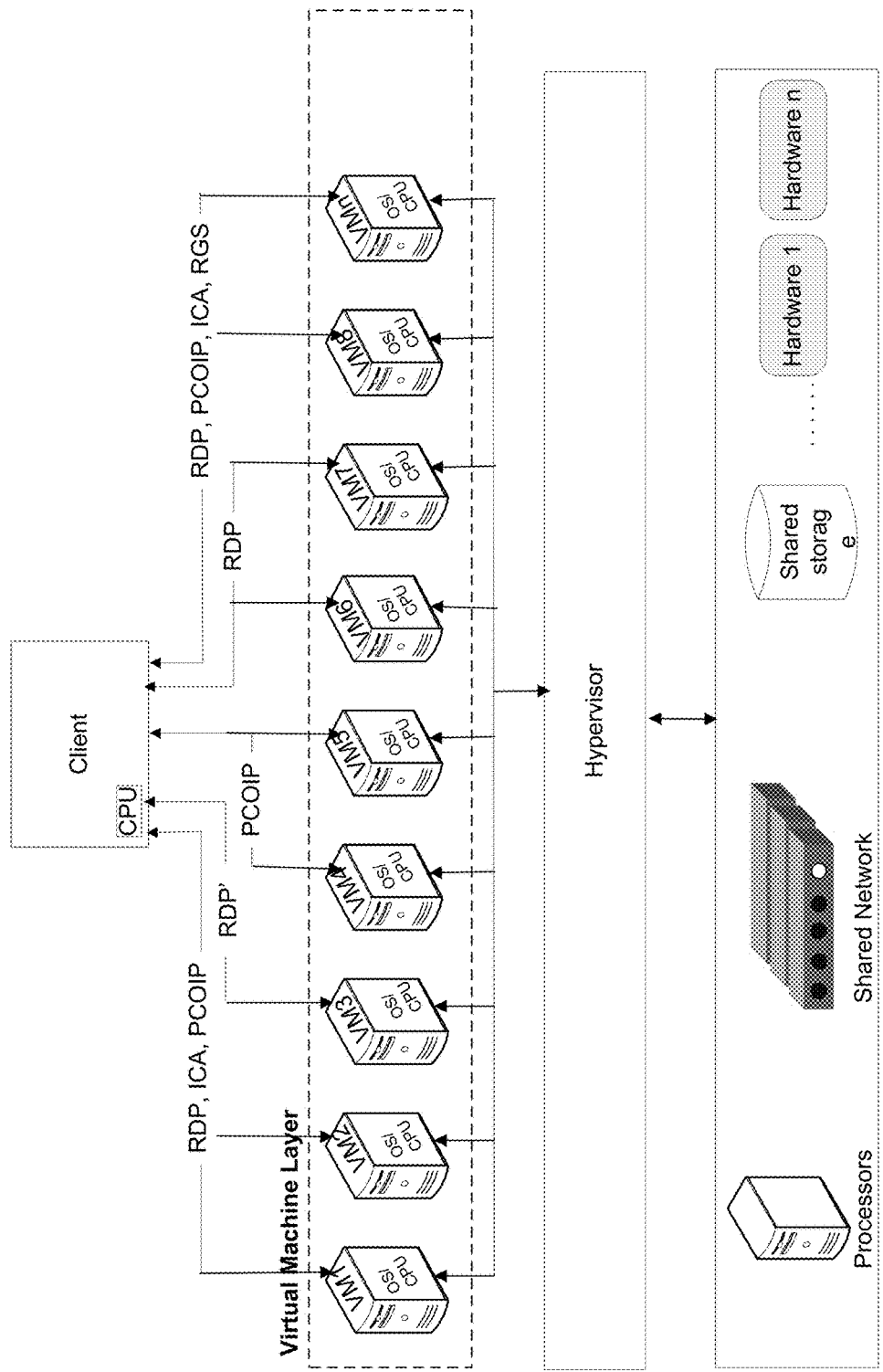
FIG. 1 shows a block diagram of a conventional system that was used in remotely accessing and controlling a virtualized computer service in a virtual environment.

Several exemplary embodiments for remotely controlling a computer system within a virtual environment will now be described. It will be apparent to those skilled in the art that the present invention may be practiced without some or all of the specific details set forth herein.

The present invention defines methods, systems, computer codes that enable access and management of a virtualized computer service (or simply a "virtual service") available at a virtual machine within a virtual environment through a remote client. The embodiments provide ways to establish connection with the virtual service using an algorithm, such as an image processor algorithm embedded in a virtual machine, such as server virtual machine, within the virtual environment. When a request for a virtual service is received at the server virtual machine (SVM), the algorithm in the SVM interacts with a hypervisor in the virtual environment over which a plurality of virtual machines are running to identify a virtual machine (VM) that provides the virtual service. Upon identification of the VM, the algorithm, through the hypervisor, accesses and reads framebuffer data from a memory of the identified VM that define a graphical output representing an image of a virtual monitor of the identified VM. The algorithm processes the framebuffer data, packages the framebuffer data into packets and sends the packaged framebuffer data to the client using a simple transport protocol for rendering at a display device associated with the client. User interaction at the client's display device for the rendered framebuffer data is captured and re-directed to the identified VM through the SVM and the hypervisor where it is processed thus providing control to the virtual service. The graphical access to control the virtual service is provided without receiving any instructions from an operating system or graphics card of the identified virtual machine.

As the access to control the virtual service is through the capture of graphical output and not through any instructions from operating systems/graphics card, the embodiments define a platform-independent solution for controlling the virtual services available at each virtual machine thereby providing a flexible and effective tool. The packaged graphical output can be deciphered/decompressed without having to use complex computation/processing enabling even a very thin client to access and control the virtual service. The simple transport protocol enables the client to access and control the virtual service over a long distance or short distance, dealing with latency and lossy network situations more naturally. As the algorithm interacts with the hypervisor to extract a virtual image of a display and not with the operating system to retrieve instructions from the operating system, the need for a powerful processor at the client to decipher/decompress the graphical language instructions can be avoided.

The workings of the algorithm are transparent to the operating system of the virtual machine. The hypervisor provides memory management for all the VMs and uses the information from connection parameters provided by the client and information from memory management to identify an appropriate VM and specific location of memory for the identified VM that provides information representing a virtual image of a display for the identified VM. The role of the hypervisor and other components to gain access to the framebuffer data will be described in detail with reference to FIGS. 2A and 2B.

In order to fully comprehend the advantages of the various embodiments, a set of terms that are commonly used throughout the application will be first described in detail. These definitions are provided as a general guide regarding the terms, but should in no way be limiting as to variations or equivalents associated therewith.

a. A "thin client," as used in the application, is a software or hardware device wherein computation can be partially done at another computer, usually at a server, remote computer, or at another networked computing device. The thin client, also called a lean, slim or dumb client, includes an interface (software thin client) or very minimal computational resources (hardware thin client) and may not even include a hard drive. In some embodiments, solid-state memory and storage is sufficient, as is common on smartphones, personal digital assistants, tablet computers, mobile phones, terminals, etc. In one embodiment, a thin client may rely on its server computer to provide the storage and other resource capability, making the device operate more like a terminal (i.e., screen, keyboard and input device). A very thin client is one wherein the associated server (or networked computing device) provides most of the computation. Example of a very thin client includes computer terminal or a display interface. A fat client (i.e., one with all of the standard standalone hardware and software) can also operate as a thin client, if the fat client is connected to a remote computer and the remote computer does most of the processing or provides the service for a particular computing session.

b. "Remote" access client, as used in this application, refers to a client that is either co-located or non-co-located with the SVM and the VMs executing on a hypervisor within a virtual center, while accessing the VMs through the SVM, using a network connection, such as Internet. Remote access can be remote, even if the client is physically located beside the hardware or server, so long as a networked (wired or wireless) connection can be established. For instance, a user could log into his or her desktop computer through a cell phone interface, although the user could in fact be at the same location of the desktop computer, or half a world away.

c. "Re-format," as used in this application, is the process where data originally defined in a specific format, such as an operating system (OS) dependent format, is re-defined to a format dictated by an algorithm. The format defined by the algorithm is not tied to any OS specific format but may be of a more universal type that can be deciphered using a non-complex de-compression protocol. Example OS specific format that may be used in the re-formatting of the data include, but not limited to, framebuffer formats for Linux™, OSX™, BeOS™, AIX™, MVS™, Windows™, etc.

d. "Re-direction," as used in this application, refers to a process of re-routing data from a pre-defined location to a new location defined by the algorithm. For instance, data from a particular virtual machine is usually stored in the respective virtual memory. In the present invention, a first virtual machine (VM1) looking for a second virtual machine's (VM2) memory locally, gains access to the second virtual machine's actual memory space through a hypervisor. The data in the memory of the second virtual machine may be read and processed at a local memory of the first virtual machine. Hypervisor, as is well known in the industry, has the ability to provide one VM access to another VM's devices/resources.

e. Virtualized computer service (or "virtual service"), as used in this application refers to services provided by the virtual machine that encompass both hardware and software related services. Some of the virtual service available at each virtual machine include, but are not limited to, shared physical hardware resources, software interfaces and programs executing at the virtual machine and/or used to access the hardware resources. A virtual service can provide the rendering for a remote desktop, remote processing of computer programs, remote games, remotely hosted entertainment digital video recordings (DVRs), personal video recordings (PVRs), and general access to datacenter-based services including access to files stored in storage assigned to a user, communication programs, video, images, pictures, data and metadata.

f. "Packages," as used in this application, refers to data packets, which are basic units of communication over a digital network. Different protocols use different structures for packaging the data. The data is formatted (processed) to comply with a specific protocol associated with the algorithm and with a transmission protocol engaged for transmitting the data between a server virtual machine and the client. The transmission protocol provides the structure for the packet depending on the type of data and may include, for instance, source Internet protocol (IP) address, destination IP address, sequence number of the packets, type of service, flags, etc.

g. "Server Virtual Machine," (SVM) as used in this application, refers to a virtual machine that manages other virtual machines' interaction with the client. The SVM includes all the components of a VM and is configured to provide functionality, similar to a server towards a client in a client-server computer system, such as providing information requested by the client. The SVM provides the information by accessing specific memory space of a corresponding VM. The SVM is equipped with an algorithm, such as an image access algorithm, that enables the SVM to gain access to the memory of the respective virtual machines through the hypervisor. It should be noted that the algorithm to access memory of the VMs need not have to be provided at a specific VM, such as SVM but can be made available at each VM running in a virtual center at which time, each of the VM acts like a SVM managing memory of other VMs.

h. "Framebuffer information" or "framebuffer data", as used in this application refers to video output data that is normally generated by an OS for presenting at a virtual machine display of a virtual machine. The OS generates the data in a specific format and consists of bitmap data that represents every pixel defining the various elements, features, images rendered on a virtual machine display screen. The framebuffer data is traced and refreshed left-to-right, top-to-bottom across the entire screen of data. Each pixel is defined to include color, depth, size, etc., so as to capture every detail of the screen. Framebuffer information defines the graphical output stored in specific portion of memory of a computing system, such as a virtual machine, which data was originally destined for rendering on a virtual machine display screen.

i. Connection parameters, as used in this application define client characteristics including connection requirements and other environmental requirements of a client. The connection parameters are usually obtained during an initial handshake with a client and may include location of the client, such as origination IP address, connection capability information, including size and quality, desired location of virtual service to connect, such as destination IP address, type of client, configuration of a display device associated with the client, including resolution, bit depth, refresh rate, service layer identification, etc.

To facilitate an understanding of the various embodiments, a brief description of a basic infrastructure of a virtual computer environment used in a conventional process will be described first followed by a detailed description of novel features within the basic infrastructure used in the embodiments of the current invention for controlling a virtual service remotely.

FIG. 1 illustrates a simple block diagram of a typical virtual infrastructure used by conventional process for providing access and control of a virtualized computer service (computer system or simply, "virtual service") within a virtual environment. The virtual environment includes a collection of physical hardware that are shared by a plurality of virtual machines (VMs) running on a hypervisor. The hypervisor or Virtual Machine Monitor is a computer platform-virtualization software that allows multiple operating systems to run concurrently on a host computer. The hypervisor provides an interface between the shared hardware and the VMs. The hypervisor is well known in the industry and is, therefore, not described in detail in this application.

A plurality of clients access the virtual resources available at the VMs using proprietary protocols, such as Remote Desktop Protocol (RDP), PC over Internet Protocol (PCOIP), Remote Graphics Software protocol (RGS), Independent Computing Architecture protocol (ICA), to name a few. The client may be a thin client, such as a low-end computer terminal, or a fat client, such as a desktop computer, laptop computer, etc. The clients access the virtual resources available at specific VMs using a service or connection broker. The service broker is a directory service that provides a mapping of different VMs to various clients based on the environmental parameters provided in the client's request. The service broker uses the mapping or connection information to determine a specific VM that will provide the requested service to the client so as to enable the client to access and interact with the corresponding operating system (OS) directly using the appropriate protocol. Thus, in order for the client to access information from a corresponding VM, the client needs to understand and follow the corresponding OS protocol. The OS provides a set of instructions that is processed at the client using the client's processor following the OS protocol. The approach of the conventional process was to recreate what is actually at the VM on the client based on the set of instructions from the corresponding OS so that a user will have access to what is going on at the VM. This approach resulted in having a powerful processor at both ends of the data exchange—at the respective VMs and at the clients for compressing and de-compressing data/information, severely restricting the size and functionality of the thin client. Further, the conventional approach is very platform/graphics layer centric relying on the OS/graphic cards to give instructions for recreating the information provided on the monitor of the VM at a display device of the client in order to control a computer system/service at the VM.

In order to overcome the restrictions of conventional process, some embodiments of the current invention use an algorithm, such as an image processor algorithm, within a virtual machine, such as a server virtual machine, running on the hypervisor that interacts with the hypervisor to obtain an image representing a graphical output of a virtual machine display of a second virtual machine (VM). The graphical output is packaged and forwarded to the client for rendering. The rendered graphical output provides a view into the display of the second VM, showing graphical elements, icons, displays, programs, links, pictures, movies, and other user interface manipulation or non-manipulation that is executing or is rendered at the second VM. The algorithm accesses and reads the image of virtual machine display directly from a predetermined location of virtual memory, without interacting with the operating system of the second VM. As a result, the algorithm does not need to follow the graphical instructions of the OS running on the second VM.

Figures 1, 2:
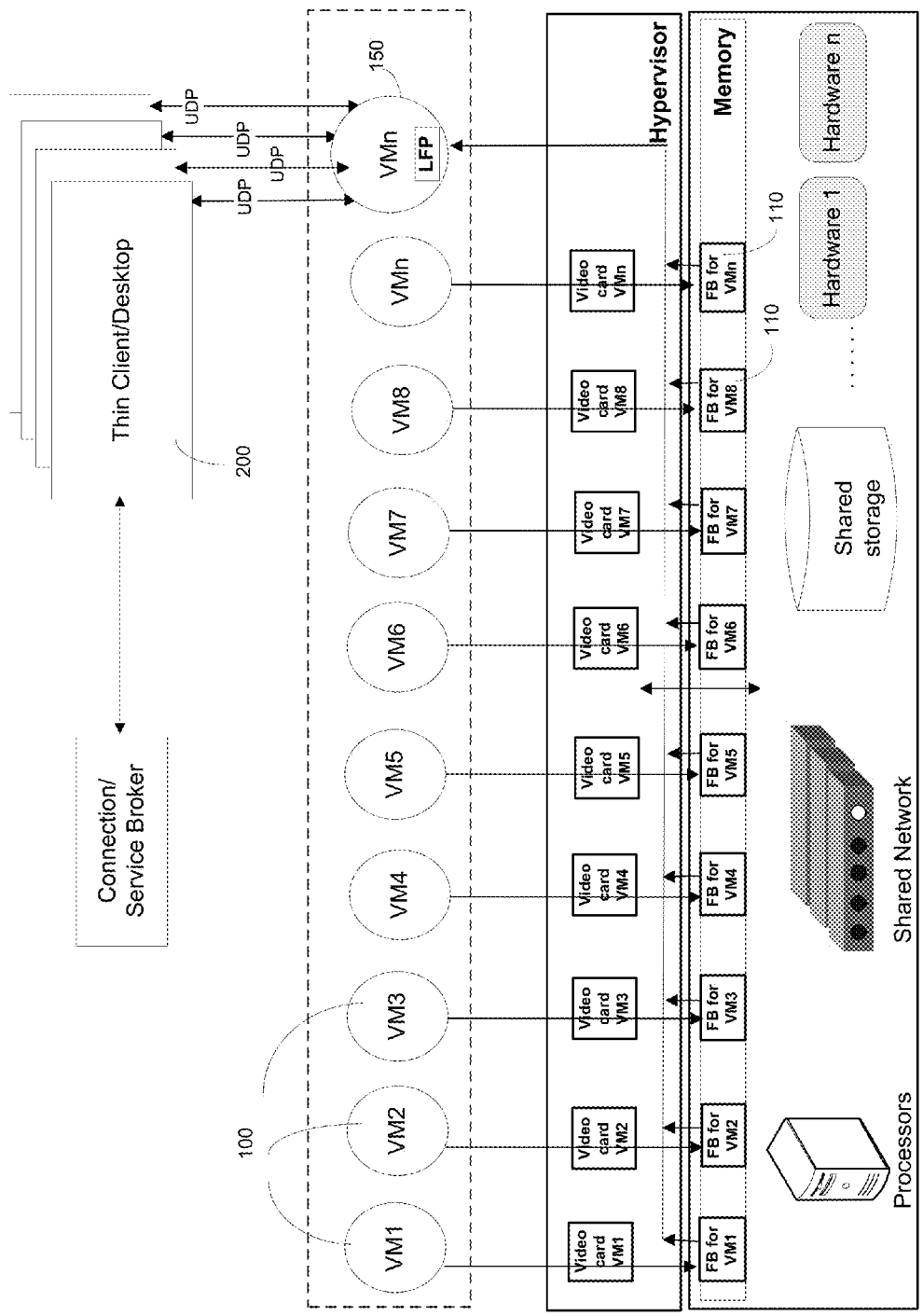
Figure 2:
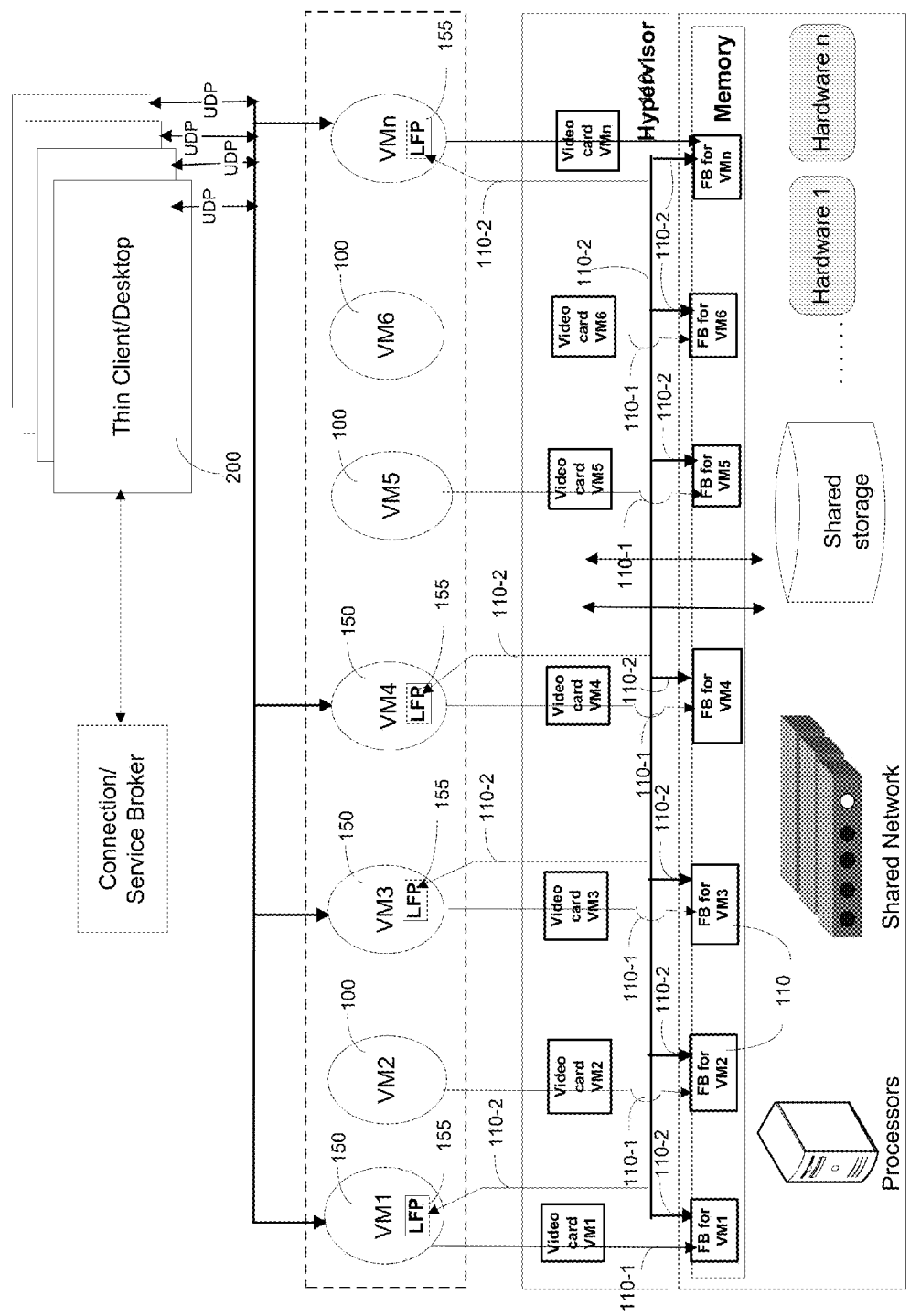
Figures 2, 3:
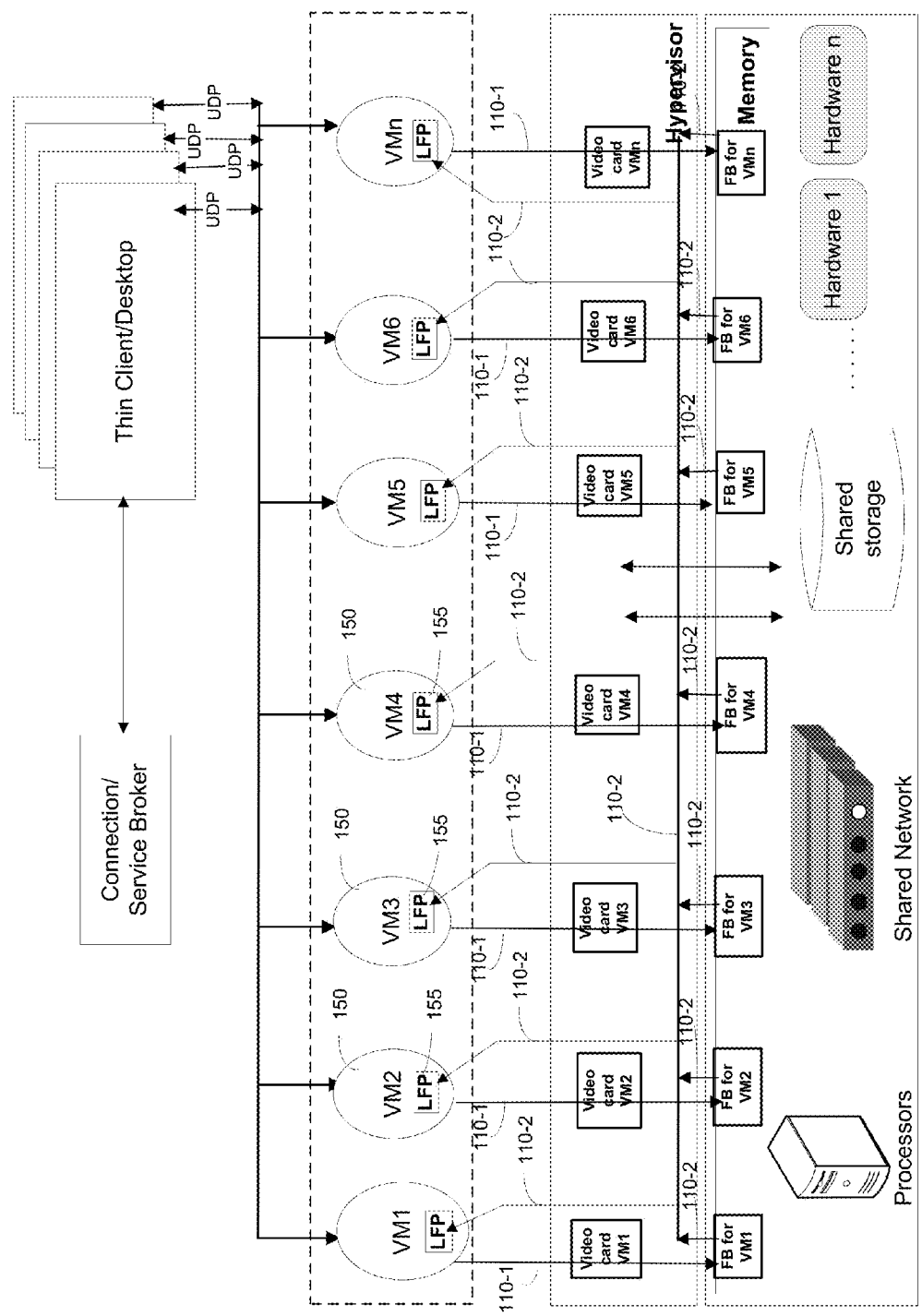
Figure 2D:
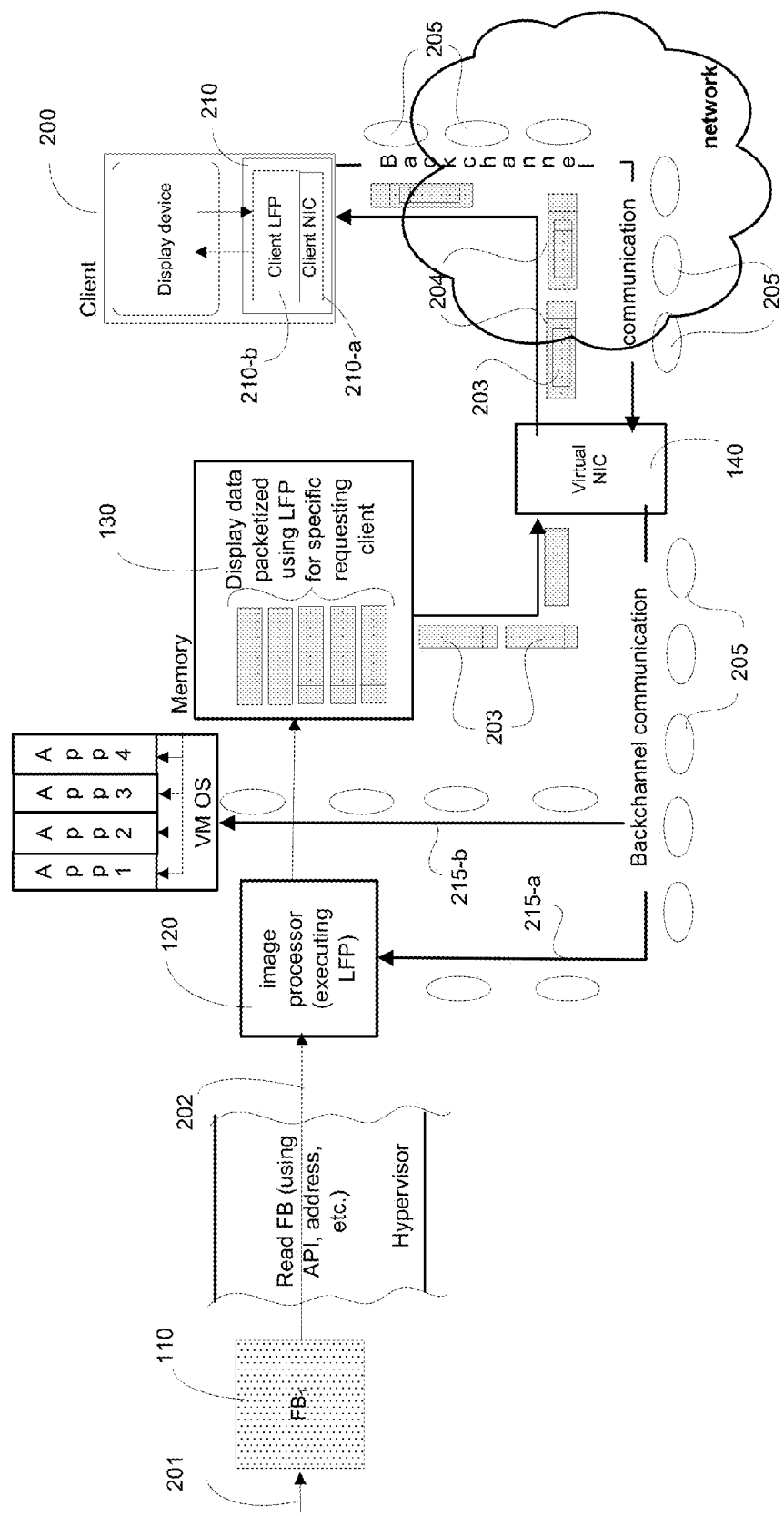
FIG. 2D illustrates a simple block diagram of the working of the image processor executing LFP in packetizing the framebuffer data and transmitting the data packets to the client.
Figure 2E:
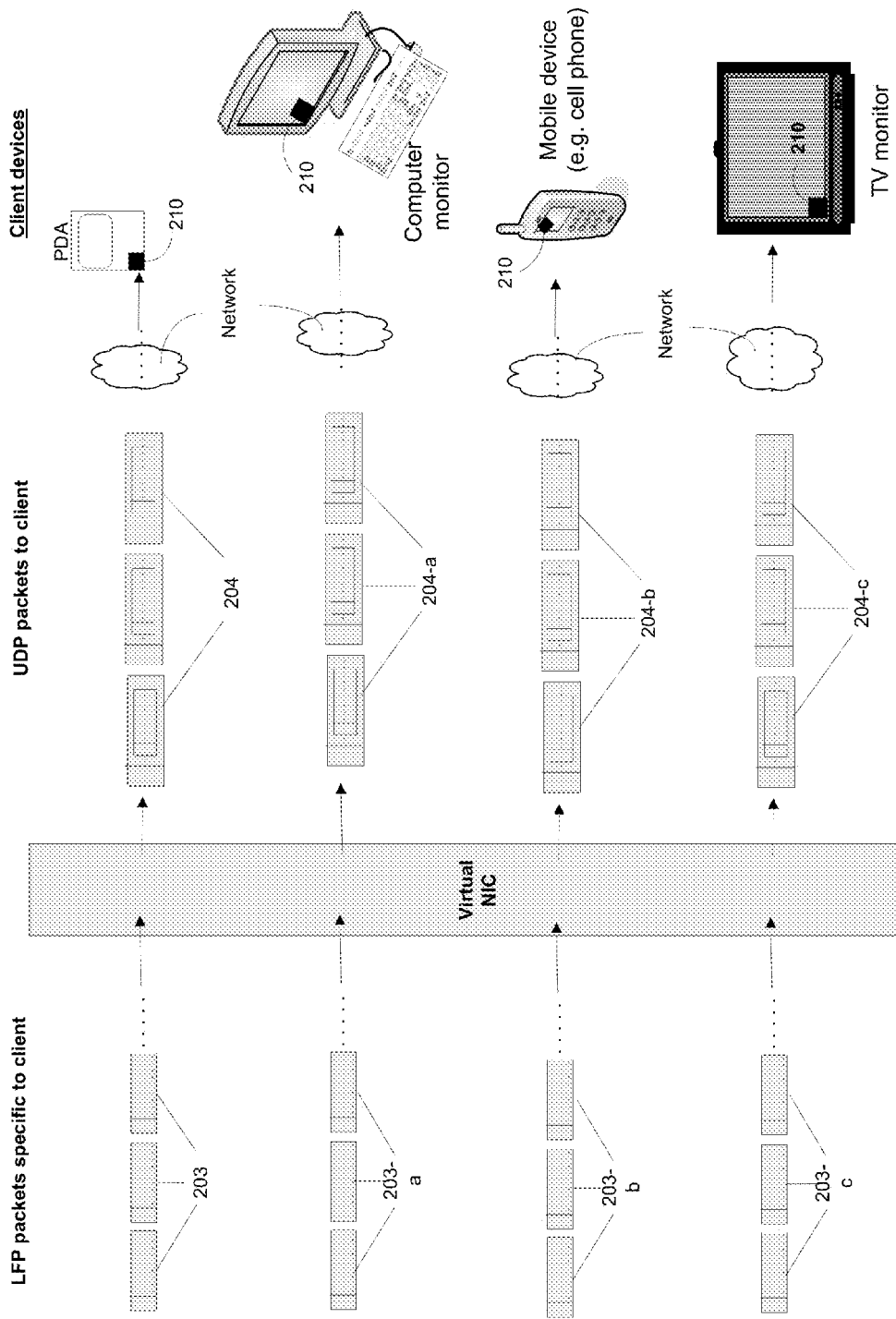
FIG. 2E illustrates sample packetization of framebuffer data according to specific clients, in one embodiment of the invention.

FIGS. 2-1 through 2-3 illustrate exemplary block diagrams of a virtual infrastructure (VI) with the algorithm provided at a virtual machine in the virtual machine layer to enable a client to remotely interact with a virtual service available at a VM without being tied to any OS protocol, in separate embodiments of the invention. FIGS. 2A and 2B illustrate the various components of a virtual infrastructure (VI) used in accessing the framebuffer information of a VM. FIGS. 2C-1 through 2C-3 illustrate a simplified view of accessing the framebuffer information corresponding to the embodiments illustrated in FIGS. 2-1 through 2-3. FIGS. 2D and 2E illustrate a simplified block diagram of the process of packaging the accessed framebuffer data to comply with the requirements of both the algorithm and a transmission protocol engaged in transmitting the packets of framebuffer data to the client. FIG. 2F illustrates a simplified view of what data is sent to the client over time. The components and function of the algorithm to control the virtual service will be described in detail below with reference to these drawings.

Image Processor:

In order for an image processor to function efficiently from a distance and through a very thin client, a few underlying principles are relied upon in the design construct of the platform and operating system independent image processor algorithm.

One of the basic principles relied upon is an image representation. Most virtual machines/virtual guests have a framebuffer construct available at each guest. A framebuffer, as used in this application, is a representation in memory of what is displayed on a monitor of a virtual machine. In other words, the framebuffer includes image data provided in specific portions of memory of a virtual machine that defines a graphical output which when processed and rendered presents a virtual image representing the virtual machine display of the virtual machine. Generally, an operating system sitting on a hypervisor is "headless", i.e. it does not need a monitor connected to it. In such cases, the operating system directs the output destined to the virtual machine display, such as a monitor, to a particular portion in memory as image data. It should be noted that the output destined to the monitor is represented as bitmap that are generally context-less. This image in memory is used by the hypervisor to establish graphical console access to the individual virtual machine. In this application, the term "framebuffer" is used interchangeably with graphical output to refer to the image data represented as bitmap and stored in specific portions of memory associated with each virtual machine (VM).

Framebuffer construct is an industry approach for redirecting the graphics signal that would normally be directed to a monitor to be loaded into memory instead. The framebuffer data is treated similar to a monitor with bit depth, horizontal scan rate and a determined size. In some operating system, such as Mac OSX™, the framebuffer is loaded by the native kernel. In some other operating systems, kernel parameters are provided within startup files to enable the framebuffer. The location within a memory of a virtual machine and its format for the image representing the framebuffer is driven by the corresponding operating system.

Another principle relied upon is, proper interpretation and handling of framebuffer construct so that the image processor algorithm (or simply "algorithm") can act autonomously. In order for the algorithm to be platform, operating system (OS) and service independent, the algorithm needs to be able to determine how to evaluate the frames on the screen from the framebuffer construct. In one embodiment, the algorithm is able to recognize contiguous areas of interest on the screen based on activity and color contrast situations so that the areas of interest defining a frame or specific information can be handled in specific ways. In one embodiment, the algorithm is configured to utilize various techniques to capture different parts of the screen in order to provide a pleasing visual effect to a viewer with the priority to maintain quality beyond human perception abilities. In one embodiment, the screen parts are captured using lossy effects. Lossy effect is obtained through a lossy compression method where data is compressed such that it loses some of its quality. This compressed data when decompressed provides data that is different from the original but is close enough to the original data. Lossy compression methods are well known in the industry and are most commonly used to compress multimedia data, such as audio, video, and graphic images, for streaming media applications.

In order for the algorithm to become efficient and performant on the network, the algorithm is designed to be User datagram protocol (UDP) compatible to enable proper user experience, in one embodiment. UDP differs from the traditional transmission control protocol (TCP) in that UDP is a "connectionless" or "stateless" protocol wherein there is no handshake or provision for acknowledgement of packets received. In one embodiment, the protocol selected for the algorithm is sensitive and adaptive to bandwidth changes, latency and loss. Although the algorithm has been described to be configured with a specific transmission protocol, it should be considered exemplary and not considered restrictive. Other embodiments can use algorithm that is compatible with other protocols other than UDP, so long as the protocol is able to provide the quality, performance and functionality defined and desired by the algorithm.

Based on the aforementioned basic principles and requirements, the various features and functionality of an exemplary image processor algorithm, will now be described with reference to FIGS. 2-1 through 2-3. It should be understood that the exemplary algorithm could accommodate some modifications for special uses, so long as the basic operation consistent with the described embodiments are maintained. In one embodiment of the invention illustrated in FIG. 2-1, the image processor algorithm is provided in a separate VM that runs on a hypervisor alongside a plurality of VMs within a virtual environment. The algorithm relies on the existing infrastructure and components of the VI and is platform/OS independent while providing the ability to work remotely over long distances and through clients that may be "thin" clients or "fat" clients.

Still referring to FIG. 2-1, the image processor algorithm 155 is provided at a virtual machine that acts as a server virtual machine (SVM) 150 running on a hypervisor alongside plurality of other VMs 100 and interacts with the plurality of VMs 100 through the hypervisor. The SVM 150 accesses, reads and manages the framebuffer data from various VMs 100. The basic infrastructure of the virtual environment is similar to the one described with reference to FIG. 1. The interaction between the SVM 150 and the VMs 100 through the algorithm 155 is local to the VMs and does not need complicated compression technology or big CPUs for capturing the graphical outputs representing framebuffer information that would be rendered on a virtual monitor screen associated with each VM. In one embodiment, the algorithm is designed to access and read each VM's 100 framebuffer data 110 directly through the hypervisor.

FIG. 2-2 illustrates another embodiment of the invention, wherein few of the VMs 150 running on the hypervisor are independently equipped with the algorithm 155. Each of the VMs 150 independently equipped with the algorithm provide the same functionality as the SVM of FIG. 2-1 accessing, reading and managing the framebuffer data from one or more other VMs 100 running on the hypervisor. In this embodiment, the framebuffer data of each of the VM independently equipped with the algorithm may be accessed and managed by other VMs independently equipped with the algorithm. FIG. 2-3 illustrates yet another embodiment wherein all of the VMs 150 running on the hypervisor are independently equipped with the algorithm 155. Each of the VMs 150 independently equipped with the image processor algorithm provides the same functionality as the SVM of FIG. 2-1 of accessing, reading and managing the framebuffer data of one or more of the other VMs 100 in the virtual center. The algorithm in each of the embodiments illustrated in FIGS. 2-1, 2-2 and 2-3, access the framebuffer data of VMs directly through the hypervisor. It should be noted that the algorithm within a VM is not just restricted to accessing framebuffer data of other VMs running on the hypervisor but is also configured to access its own framebuffer data directly through the hypervisor. It should be noted that the aforementioned embodiments are exemplary and should not be construed as limiting. Accordingly, one skilled in the art will recognize that any permutation and combination may be used for providing the image processor algorithm independently at a specific VM, a few specific ones of VMs or on all the VMs running on the hypervisor and may be based on the VMs resources and accessibility.

The read framebuffer data is processed by the algorithm into image data packets that comply with the requirements of the algorithm and forwarded to a virtual network interface card (NIC) within the VM running the algorithm where the image data packets are further packaged to comply with the requirements of a transmission protocol, such as UDP. The packaged image data is then transmitted using a UDP protocol or other functionally equivalent manner.

The process of accessing, reading of the framebuffer data and the roles of the various components involved will now be described with reference to FIGS. 2A and 2B.

FIG. 2A illustrates a traditional approach used in directing the framebuffer data by an operating system (OS) associated with a specific VM. The OS of each VM includes a video driver for capturing image data representing the graphical output for the specific VM that is normally presented at a monitor associated with the VM. The video driver in the OS directs the image data to a physical video card that has been presented to the OS. The video card interprets the image data for the VM into a graphics image and presents the interpreted graphics image at the virtual machine display of the VM. An administrator/user, working at the command center for the hypervisor, which is usually a VM with special hypervisor access tools, accesses the VM and connects to the virtual machine display of the VM to troubleshoot or to generally control one or more services available at the VM.

As is known, there are many ways of capturing the framebuffer. The above examples are provided to envision that the way of capturing framebuffer will continue to change and expand. For instance, accessing the framebuffer will depend on the developer of the hypervisor, and specific APIs can be used to find the location of the framebuffers for specific VMs. The APIs may define a protocol for identifying specific framebuffers and reading the framebuffer data for those specific VMs. The goal here is to read and capture the framebuffer irrespective of the format.

The graphics image that is normally directed to a virtual monitor of a VM is, instead, directed as framebuffer data to a pre-defined location in a virtual memory layer in the virtual center. The image processor algorithm interacts directly with the hypervisor to gain access to the framebuffer data of the VM at the pre-defined location in virtual memory layer so as to interpret, process, package and transmit the processed framebuffer data to the client.

FIG. 2B illustrates the process of accessing framebuffer data for a specific virtual machine using a virtual graphics card within a virtual center. As illustrated in FIG. 2B, an OS running on a VM includes a video driver. A hypervisor available in the virtual center includes a virtual graphics card. The video driver at the OS of a VM interacts with what it perceives as the physical video (graphics) card. Instead, the OS is actually interacting with a virtual graphics card that the hypervisor has presented to the OS of the respective VM as a physical graphics card. The OS of the VM processes the analog or digital representation of data that is usually targeted to a virtual machine display of the VM into framebuffer data. The framebuffer data representing the graphical output is written through the VM's graphics driver to the virtual graphics card. The virtual graphics card, in turn, loads the framebuffer data into a corresponding pre-determined memory location in the underlying virtual memory layer accessible through the hypervisor.

The virtual graphics card is a generic card, such as a Video Electronics Standards Association (VESA) card, presented by the hypervisor to all the VMs that directs the OSs running at different VMs to write the framebuffer information to a predetermined memory address in the underlying virtual memory layer accessible through the hypervisor. It should be noted that the framebuffer information stored in the underlying memory layer is usually in the form of bitmap. The bitmap is raw, context-less data. Using the algorithm the virtual machine is able to access framebuffer data of all the VMs through the hypervisor, which is managing the underlying memory, devices and resources for all VMs. The framebuffer information (data) is often available through the kernel, using device locations, such as /dev/fb0, for instance. The algorithm within SVM (for instance, LFP server), such as the image processor algorithm, sitting on a same bus as the hypervisor, accesses and reads the framebuffer information for a particular VM directly through the hypervisor using connection information from the client, analyzes the read framebuffer data of the particular VM for changes and any newly acquired framebuffer data, processes the framebuffer data based on the analysis, makes decisions on the compression techniques to be used, generates a plurality of image data packets, then packages the packets of framebuffer information to comply with both the algorithm and a generic transmission protocol, such as UDP, transmits the packaged framebuffer data to the client for rendering at a respective display device, measures the arrival of packets and retransmits data as needed. During the processing of the framebuffer data, context associated with the framebuffer data is determined and appropriate contextual information is associated with the framebuffer data.

FIGS. 2C-1 through 2C-3 illustrate simplified block diagrams of the flow path used in storing and accessing the framebuffer data. FIG. 2C-1 illustrates one embodiment wherein an OS executing on a VM 100 running on a hypervisor directs the corresponding framebuffer data to a specific location FB 1 110 in the virtual memory layer within the virtual infrastructure. Accordingly, during execution, $VM_1$ 100, with the help of the video driver and virtual graphics card, stores the respective framebuffer data at location FB1, as illustrated by path 110-1. The algorithm 155 accesses the stored framebuffer data for the VM at FB1 directly through the hypervisor, as illustrated by path 110-2. Similarly, FIG. 2C-2 illustrates another embodiment wherein an OS running on VM 100 executing on a hypervisor stores the framebuffer data in specific memory location FB1 so that the LFP algorithm 155 can directly access the framebuffer information from FB1. In another embodiment illustrated in FIG. 2C-3, a VM running the algorithm acts as a server VM 150 wherein the OS of the SVM directs the framebuffer information of the SVM to be stored in specific portion of the underlying memory FB1, as illustrated by path 110-1 and accesses the stored framebuffer information from FB1 directly through path 110-2.

The framebuffer information from the different VMs is driven by the operating systems executing on the VMs and could be of varied format. The algorithm enables access to the framebuffer information presented by different OSs, provides direction to convert the framebuffer information from different OSs into packets of a generic format using a formatting tool available within the algorithm, such as "Lightweight Framebuffer Protocol" tool, that is composed of situational message types and forward the re-formatted framebuffer information to the client using a transmission protocol, such as a user datagram protocol (UDP). As mentioned earlier, the framebuffer information is raw, bitmap information that has no context attached to it. The algorithm reads the bitmap information associated with the framebuffer data from a specific memory location for a VM, analyze the bitmap data by identifying areas of activity and inactivity, add context to the data based on the analysis and generate smaller packets with the added contextual information. For instance, the data analysis may identify a frame and areas of activity within the frame. The context-loaded packets are packaged using a formatting algorithm available in the algorithm and forwarded to the virtual NIC within the SVM where the packets undergo additional packaging to comply with the transmission protocol. The fully processed and packaged data is forwarded to the client for rendering. It should be noted that most of the analysis and context rendering for the framebuffer data is performed locally inside the virtual center and within the SVM or VM using the algorithm. As a result, there is no need for additional analysis or deciphering to be performed at the client end or to analyze the framebuffer data to understand the context. The client just has to unpackage the bitmap data with the loaded context and render on the client's display device. The client identifies lost information to the SVM, which retransmits as required. Since the message types and packet information are relatively small and simple, retransmission can be conducted surgically with little overhead.

FIG. 2D illustrates the process of accessing and packaging the framebuffer data for onward transmission to the client and the feedback from the client in response to the rendered packets. As illustrated, the framebuffer data 110 of a VM available in specific location of virtual memory (FB1) is accessed directly by the SVM's image processor algorithm 155, such as LFP, that includes a formatting algorithm. The algorithm 155 can access and read the stored framebuffer information using API, memory address, etc. The algorithm 155, then, processes the framebuffer data to generate smaller image data packets 203 of the framebuffer data within memory 130 of the SVM using the SVM's processor. The processing of framebuffer data includes analyzing the framebuffer data to identify the context and integrating the contextual information with the data when generating the image data packets 203. Although the process of accessing and packaging the framebuffer data is explained with reference to the algorithm executing on a SVM, it should be noted that the algorithm is not restricted to just executing on the SVM but can also be executing on a VM and accessing the framebuffer data. The image data packets 203 are generated using a formatting algorithm available within the image processor algorithm 155 so as to comply with the requirements of the connection parameters of the client and are specific to the client. As mentioned earlier, the connection parameters provide characteristic details of the client, such as acceptable packet size, client type, etc., that the algorithm 155 can consider these requirements when generating the packets 203 for the client. The packets 203 are forwarded to a virtual network interface card (NIC) 140 where the packets undergo additional processing to add network packaging on top of the package provided by the algorithm. The resulting processed package 204 includes both the algorithm package information and network package information. The fully processed packets 204 are forwarded to the client 200 using the transmission protocol for rendering at a display device associated with the client 200.

Still referring to FIG. 2D, the packets targeted for the client 200 is received by a client NIC, 210-a. The client NIC 210-a is a standard NIC card that is available in each of the client and is used to strip the outer NIC specific network package 204 of each packet and forward the stripped down package 203 to a client algorithm, such as client LFP, 210-b. The client LFP 210-b is a simple version of the image processor algorithm provided in the VM which is used to read the stripped down package received from the client's NIC and process the data to strip the algorithm specific package. The resulting partial framebuffer data obtained after the stripping of the package information is assembled and rendered at the client's display device. The stripped down framebuffer data includes bitmap information and the associated context and is specific to the client. Since the packets are packaged using simple and generic algorithm, the decompression logic in the client's LFP algorithm is also simple and does not need complex processing thereby avoiding heavier CPU at the client. As a result, even a thin-client is capable of decompressing the packages using simple decompression logic.

Any user input, such as keyboard strokes or mouse clicks, at the rendered output maybe captured and transmitted back to the SVM through backchannel communication, in one embodiment. In another embodiment, automatic feedback on the state of the connection may be sent from the client device to the SVM periodically. These user input and automatic feedbacks maybe packaged using the client algorithm and client NIC. The packaged user input and feedback packets 205 are forwarded back to the SVM where they are decompressed and processed. In one embodiment of the invention, the user input and feedback packets 205 are forwarded to the SVM to inform the algorithm of what has been rendered at the client 200 and the state of the connection. In another embodiment, the user input and feedback packets 205 are forwarded to one or more applications executing at the corresponding VM through the respective OS. The packaging of the user input and feedback packets 205 are based on the data destination.

The formatting algorithm used for packaging framebuffer data relies on information associated with the client requesting the information. The client related information defines the characteristics of the client and is obtained by analyzing the connection parameters, which define the type of client, type of OS running on the client and other environment dependent parameters. The formatting algorithm uses this information to package the framebuffer data accordingly. For instance, in one embodiment illustrated in FIG. 2E, the formatting algorithm uses the client related information for a mobile phone-quality thin client in order to generate simple image rendering content 203-b using techniques that provide good refresh rate whereas the formatting algorithm uses the client related information for a desktop-based thin client in order to generate complex message types 203-a that are tailored for a richer experience. Additional formats for other types of clients, such as image rendering content 203 for personal digital assistant-quality thin client and image rendering content 203-c for a television monitor/screen/display-based client, may also be generated using the formatting algorithm. Further, as the formatted graphical output uses UDP for transport, the client can access and control the service over a long or short distance. The graphical output generated using the UDP protocol is varied based on the varied input from specific-client based packets received from the formatting algorithm. Thus, graphical output 204 corresponds to image rendering content 203, graphical output 204-a corresponds to image rendering content 203-a, and so on. It should be noted that the UDP used in the transport of the data is exemplary and should not be considered limiting. Other transmission protocols may be used so long as the client's ability to access the service over a long or short distance is maintained.

As described, the image processor algorithm accesses the framebuffer information for the respective VM directly via the hypervisor so that the algorithm can retrieve, process, package and transmit the appropriate framebuffer information to the client. The algorithm does not interact with any OS and as a result does not need any proprietary protocol for retrieving the framebuffer information from the hypervisor. To assist the algorithm to identify the framebuffer associated with the appropriate VM, the hypervisor includes a memory and device manager that maps the client request to the framebuffer of appropriate VMs. When a client requests for a connection, the algorithm within the SVM, in one embodiment, interrogates the connection parameters associated with the connection request, determines the identity of the client and the details of the VM that can provide the virtual service and interacts with the memory manager at the hypervisor in identifying and locating the VM. Using the information from the connection parameters and the mapping information from memory and device manager, the algorithm identifies the VM and then directly accesses the framebuffer of the identified VM from a pre-determined memory location when the hypervisor makes the device and memory available to the algorithm at the SVM.

With the above general understanding of the function of the algorithm, various aspects of the algorithm will now be described in detail. To assist in the capture and transmission of appropriate portions of each VM's framebuffer data, the algorithm includes a plurality of modules. These modules are software (and/or hardware) modules that may all be integrated into a single image processor algorithm or may exist as independent modules. Some of the modules that are included in the algorithm include a Scan Engine, a Heat Engine, a Context Engine, Logic Engine, Connection Engine and an Output Engine.

The Scan Engine is configured to discern the virtual image and the changes in the framebuffer of a VM and store the state maintenance of the framebuffer in a time-based construct. FIG. 2F illustrates a sample of time-based construct maintained and transmitted for each VM's framebuffer data. For instance, based on the client characteristic information, an image construct for a client is assembled for the client's display device. In one embodiment, the image construct may include information obtained from LFP app server 1. In another embodiment illustrated in FIG. 2F-1, in addition to the information from app server 1, the image construct may also include information, such as advertisement information, from a LFP "ad" server and other app server information, such as the one obtained from LFP app server 3. In addition to the image construct information, any deltas associated with the image construct information from respective sources are also captured, packaged and transmitted. As each of the image construct information is obtained as bitmap information, only the relevant sectional information of the bitmap is transmitted from each LFP server. Thus, as shown in FIG. 2F-1, the bitmap information from LFP app server 1 includes all the bitmap information and any delta from LFP app server 1 except the area covered by box 1 and box 2. Information for box 1 including any deltas is obtained from LFP ad server and information for box 2 including any deltas is obtained from LFP app server 3. The bitmap information from various sources is received as in-band transmission. Thus, when information is transmitted, the image data is decompressed, assembled and rendered at the client's display device only relevant information from each source is included thereby saving network bandwidth and computing resources.

In addition to in-band transmission, the algorithm enables out-of-band transmission to be rendered at the client. Thus, as shown in FIG. 2F-2, the information and any deltas associated with in-band transmission for areas visible in the display monitor are obtained and rendered at the client. In this embodiment, information for areas that are not visible is not obtained, thereby preserving network bandwidth and processing resources. In one embodiment, the entire screen of the client may be used to render an out-of-band stream, such as a video stream. In this embodiment, the algorithm determines the amount of display area used for rendering the out-of-band stream and intelligently avoids generating any in-band transmission packets for the client as there is no visible space in the client's display device for rendering the information, thereby saving network and processing resources and processing time. Thus, the algorithm provides the intelligence to determine which framebuffer data is being rendered and what sources are being used and the image construct is generated based on the determination.

Referring back to FIG. 3B, the Heat Engine is configured to have a sliding scale of precision in locating areas of activity within a graphical frame of the VM's framebuffer and to discern the level of activity as a velocity derivative of the state activity. The Context Engine is configured to evaluate the heat engine output to determine if contiguous areas can be identified by elements, such as activity and contrast, so as to treat the areas with specific specialized techniques. A Logic Engine is configured to determine which technique should be employed for compression/transmission based on inputs from various modules, such as rate of heat, color composition, contrast of heat area obtained from the framebuffer of the VM through the Heat Engine, input from the Context Engine, platform of the connected thin client and quality of connection obtained from Connection Engine. The Logic Engine is also configured to encode the analyzed image data information with the selected technique.

The Connection Engine is configured to interact with a plurality of modules, such as a) the thin client for initial handshake and ongoing quality of connection dialog; b) the Logic Engine to obtain and address quality issues; c) the Scan Engine in order to direct the Scan Engine to look at the proper VM's framebuffer. The Connection Engine identifies the appropriate VM's framebuffer by interacting with a user-to-asset directory system. The Connection Engine is also configured to interact with the Output Engine to determine the location of the client so that the transmission of the framebuffer information of the VM can be directed appropriately.

The Output Engine is configured to define optimal packet size so as to design a custom header and to transmit the custom header and the associated data to the thin client in an efficient manner using a simple transport protocol, such as UDP.

In one embodiment, the algorithm interacts with the hypervisor and not directly with the OS of the VM. In an alternate embodiment, some OS interaction may be possible. Regardless, the algorithm will be transparent to the graphics instructions from the OS to the underlying hardware. The traditional process of capturing screen information was through the use of a graphic card, such as graphic cards from ATI Technologies Inc., or from NVIDIA™. This required lot of CPU power and customized compression/decompression logic that added to the overhead of the virtual environment resulting in poor performance and low user satisfaction. With the current embodiments, the algorithm interacts with the hypervisor to directly access the framebuffer information of the respective VMs. Further, since the framebuffer data is in raw bitmap data format and the algorithm reformats the raw bitmap data, there is no need for a complex compression/decompression logic to decipher graphics instructions. As the algorithm is focused on retrieving the framebuffer through the hypervisor and not the actual instructions from the OS, there is no need for proprietary protocols to encode/decode, making this a OS/graphics card independent.

Figure 3A:
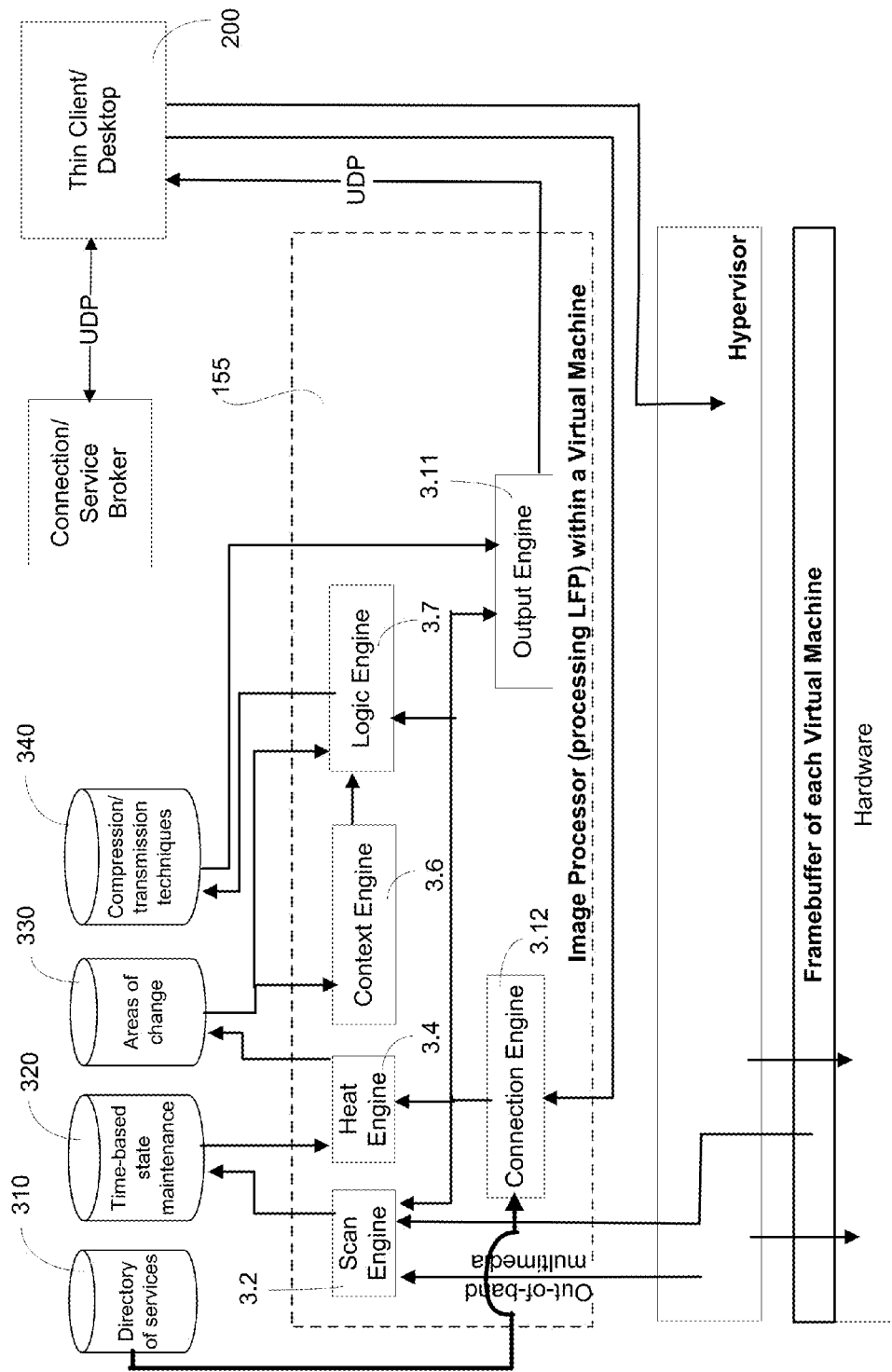
FIG. 3A is a simplified block diagram identifying various modules within a image processor algorithm and the interaction between the various modules, client and services, in one embodiment of the invention.
Figure 3B:
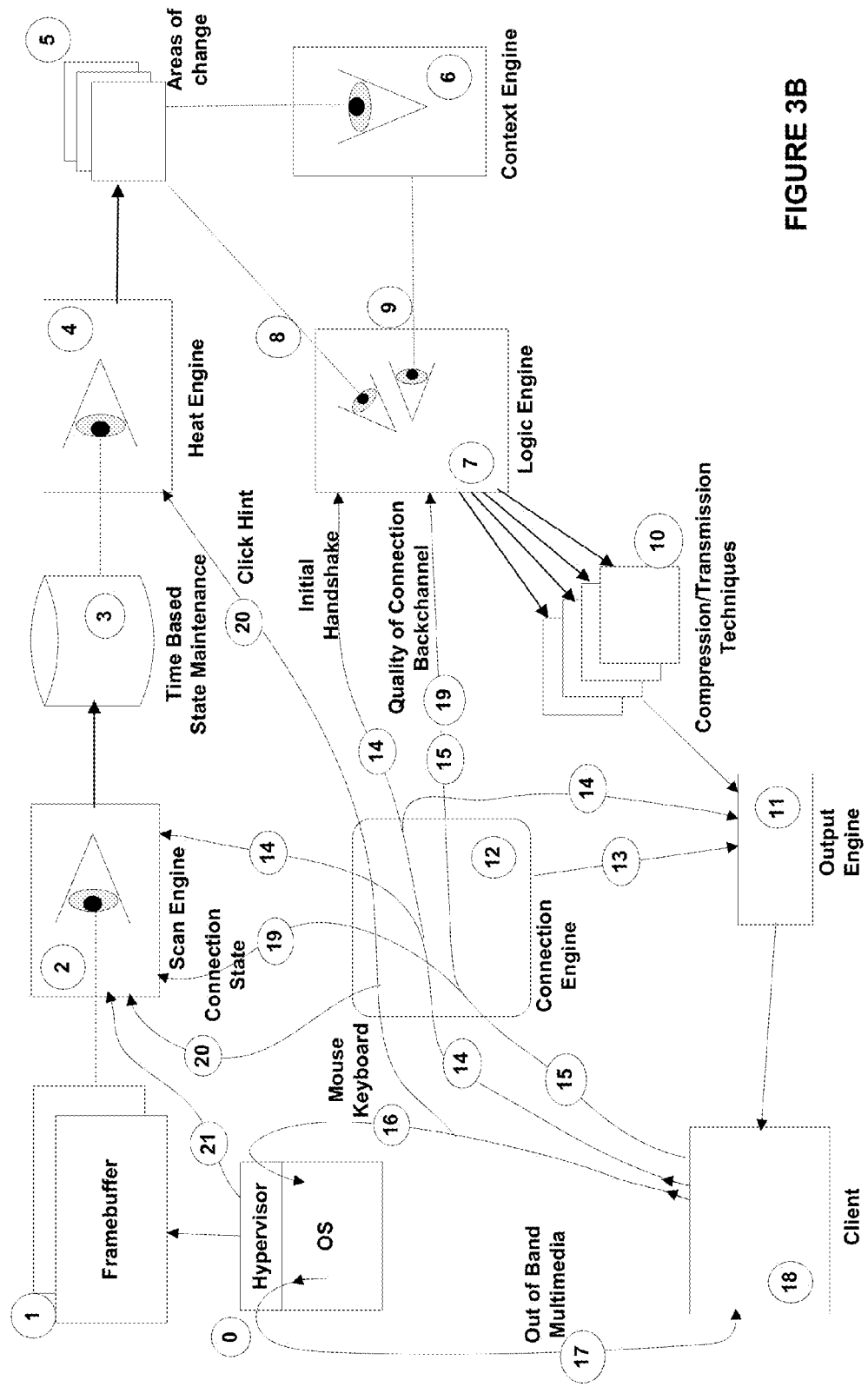
FIG. 3B illustrates a block diagram identifying the detailed flow of information between the various modules and components of the system, in one embodiment of the invention.

The details of various modules within the algorithm will now be described with reference to FIGS. 3A and 3B, respectively. FIGS. 3A and 3B illustrate simplified block diagrams of the various components involved in leveraging the framebuffer for a particular VM. FIG. 3A illustrates the system components and a simple overview of the interactions between the various components for controlling a virtual service within a VM and FIG. 3B illustrates a simplified block diagrams of various components of the image processor algorithm along with process flow used by the algorithm in leveraging the framebuffer for a particular VM through the hypervisor and directing the transmission of the data associated with the framebuffer to a corresponding client. The client may be a "thin" client or a "fat" client. A thin client may include anyone of mobile devices, personal digital assistants, cell phones, screens, netbooks, kiosks, smart phones, tablets or other such devices. A fat client may include a desktop computer, a laptop computer, workstations, etc. The above list of thin and fat clients is exemplary and should not be construed as limiting.

As shown in FIG. 3A, an algorithm, such as the image processor algorithm is provided within a server VM, such as a LFP (Lightweight Framebuffer Protocol) SVM, that runs on a hypervisor alongside other VMs, in one embodiment of the invention. The SVM, in this embodiment, is distinct from other VMs. The algorithm includes a plurality of modules, such as Scan Engine, Heat Engine, Context engine, Logic Engine, Connection Engine and Output Engine, to receive a connection request, interrogate connection (or environment) parameters and identify a VM that provides a virtual service requested in the connection request, access and read framebuffer data associated with the identified VM, package the framebuffer data into image elements, periodically scan the framebuffer to determine areas of contiguous activity and level of activity, identify the context, determine an appropriate technique(s) to use for processing, packaging and transmitting the image elements to the client for rendering and transmit the image elements.

The modules within the algorithm interact with a directory service 310 to determine the mapping of the client to a service available on a specific VM so that the request can be directed appropriately, a time-based state maintenance database 320 to store areas of activity based on the level of activity over time, an areas-of-change database 330 to determine the different areas that have changed so as to recognize frames and allow the logic engine to focus only on those areas and ignore the areas of non-activity, and a compression/transmission techniques database 340 to identify appropriate technique(s) to use for compressing the relevant image areas prior to transmission to the client. A connection or service broker external to the algorithm helps in identifying the VM so as to enable modules of the algorithm to interact with the identified VM for obtaining access to the framebuffer data for onward transmission to the client as image data elements. The transmitted image data elements is received at the client where the elements are decoded and a decompression is performed and the decompressed data is presented for rendering at a display device associated with the client. The rendered data is specific to the client and represents an image of the VM display of the specific VM. Accordingly, the rendered image shows graphical elements, icons, displays, programs, links, pictures, movies, and user interface manipulation or non-manipulation that is executing or is rendered at the VM. User interaction is enabled at the client and the user interactions are transmitted back to the VM using backchannel communication resulting in the control of a virtualized service at the VM. It should be noted that the service provided by the algorithm is a display service, such as an image of VM display of the specific VM.

The algorithm also enables the scan engine to determine portions of the framebuffer that have contiguous areas of activity of specific type so that specialized techniques can be used to extract the portion of contiguous areas, package and transmit the package. In one embodiment, an out-of-band stream can be invoked where the framebuffer data is decompressed and overlaid on a display device associated with the client. Usually, video content multimedia data use such approach so as to keep both the audio and video content together.

We now turn to FIG. 3B to better understand the interaction and process flow of framebuffer data within the various modules of the algorithm and the components of the system for accessing and/or controlling a virtual service at the VM through a remote client. As mentioned earlier, the remote client may be a thin or fat client that is co-located or non-co-located with the VM but is connected through a network, such as the Internet, to the VM. In one example, the process begins when a client (3.18) initiates a connection request to the virtual service. A Connection Engine (3.12) in the image processor algorithm at a VM, such as a Server VM (SVM), receives and interrupts the connection request and ascertains policies, authentication information and location of client and service requested by the client (3.18). The function of the Connection Engine (3.12) is described with reference to FIG. 8.

As shown in FIG. 8 and cross-referring to FIG. 3B, a connection request is received from a client (3.18 or 8.4) for servicing. During the request receipt and request service process, the Connection Engine (3.12) interacts with the client (3.18 or 8.4) for an initial handshake (3.14) and for maintaining an ongoing quality of connection dialog (3.15, 3.19). A routing logic 8.3 within the Connection Engine (3.12) receives the request and, in turn, makes calls (8.1) to directory services (8.2) to ascertain policies, authentication information and location of client and services. In one embodiment, the directory service (8.2) is an external service. The information exchanged during the initial handshake (3.14) identify one or more connection parameters that includes, but is not limited to, the location of the client (8.4), the connection capability (communication connection bandwidth, quality of communication connection) information, the desired location of virtual service to connect (3.0), the type of client (8.4), type of data requested, type of display associated with the client and the configuration of the display (resolution/bit depth/refresh rate) associated with the client (8.4). The connection parameters define the characteristics of the client.

The Connection Engine (3.12) also interacts with logic engine (8.6) to feed/update quality issues (3.15) associated with the connection over time based on the initial handshake and ongoing dialog (3.19); with scan engine (8.5) to direct scan engine to look at appropriate framebuffer associated with the VM resource (service) for which the request is initiated by the thin client (8.4); and with the output engine (8.7) to direct transmission to the location of the client (8.4).

Referring now to FIG. 3B, generally an operating system (OS) of a virtual machine that sits on a hypervisor (3.0) inside a datacenter does not need a monitor connected to it and is considered "headless". In this situation where the OS is headless, the OS directs its output to a framebuffer (3.1). The framebuffer (3.1) is information associated with an image stored in a specific portion of memory associated with a specific VM and accessed by the OS of the specific VM that defines the graphical output representing an image of a virtual machine display of the VM. Administrators have historically used this framebuffer construct to provide graphical console access to the individual guests/VMs. In one embodiment, the framebuffer may be updated at the graphical console by a graphics driver, such as a Video Electronics Standards Association (VESA) driver or emulated hardware driver, at a driven frequency, similar to a monitor. However, other ways, such as software processes, may be used to update the framebuffer.

In one embodiment, using the framebuffer and connection state information from the Connection Engine 3.12, the Scan Engine (3.2) automatically scans the appropriate framebuffer generally at the same frequency that it is updated and evaluates the framebuffer for changes. With the information picked up during the initial handshake (3.14) such as the type of client, the Scan Engine (3.2) may choose to override the defaults set for capturing framebuffer changes based upon the client capability or service rules. As an example, in a situation where the client is incapable of high refresh rates that might be typical of framebuffer data, the Scan Engine (3.2) may choose to throttle back scanning and capturing framebuffer changes to conserve resources. The Scan Engine (3.2) stores the state of the framebuffer changes for the respective VM in a corresponding time-based storage array (3.3).

Alternately, in another embodiment, the Scan Engine (3.2) can sit latent waiting to be notified (3.21) when the graphics driver associated with the VM changes the information in the corresponding framebuffer and then would subsequently conduct a scan upon notification. In one embodiment, a "sync flag" or "sync signal" may be used to determine when the graphics driver updates/refreshes the corresponding framebuffer, so that the Scan Engine can capture the change soon after without loss of any data or without interfering with the write/refresh operation.

Figure 4:
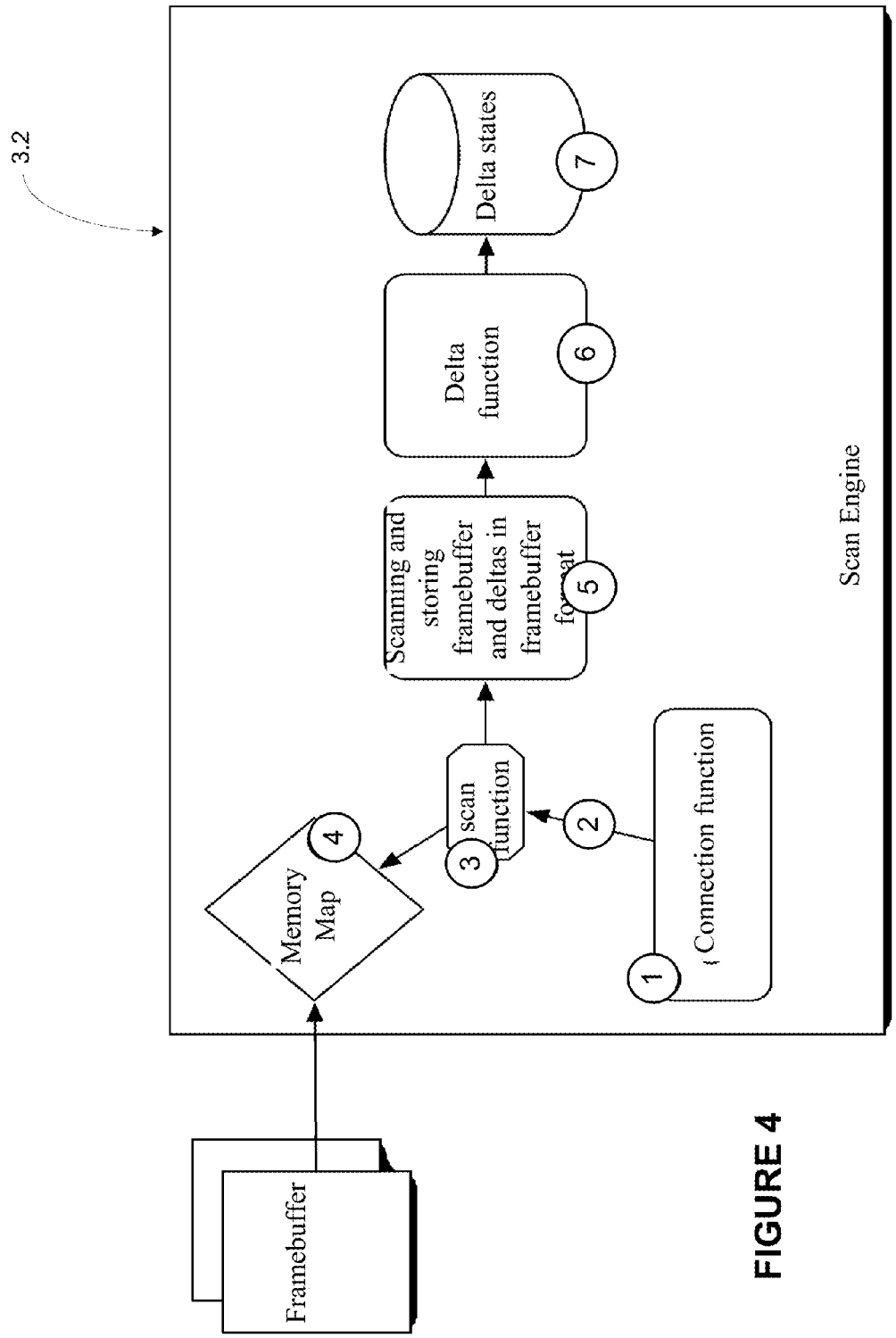
FIG. 4 is a block diagram defining process flow within a scan engine used in the remote access and control of a computer system, in accordance with an embodiment of the present invention.

The function of the Scan Engine is described with reference to FIG. 4. Referring alternately to FIGS. 3B and 4, the Scan Engine (3.2) includes a plurality of logic to enable the Scan Engine to discern the changes in a framebuffer associated with the particular VM and to store the state maintenance of the framebuffer changes in a time-based construct. Specifically, the Scan Engine (3.2) may include a connection function (4.1) that talks to the scan function (4.3). The dialog (4.2) consists of the location of the framebuffer that needs to be connected to, the expectation of size, bit depth and scan frequency. The dialog (4.2) is driven from the information received from the Connection Engine during the initial handshake and through the ongoing dialog the Connection Engine maintains with the client through connection parameters. The scan function (4.3) engages a memory map (4.4) of the framebuffer and starts to scan the information in the framebuffer.

The scan function then engages a delta function to look for changes from the preceding scan (4.6) and then stores the delta states (4.7) in a time-based array in order for the heat engine (3.4) to use. The delta states (4.7) represent the areas of activity within the graphical framebuffer. The connection function (4.1) may modify the scan behavior engaged by the scan function (4.3) in terms of speed, calling a pause/re-engage or disconnect and release of the memory map (4.4).

After the scanning of the framebuffer, a Heat Engine (3.4) is engaged by the algorithm to interpret the scanned information. In one embodiment, the Heat Engine (3.4) looks at the time-based array that defines the changes in the framebuffer and the delta states identified by the Scan Engine, and evaluates areas of activity to determine the level of sustained activity over time. For example, it may utilize signal amplification search algorithms to boost the sensitivity of granular areas of the framebuffer information. In one embodiment, search algorithm works on the mechanism in a graduated trough basis. For instance, the search algorithm works its way in a partitioned area via a gross binary search pattern to determine if there is activity and then subsequently where the activity is. Upon finding activity, it continues a search pattern by ruling out areas of non-activity and resolves itself only to the level of actual activity and exits the remainder of the search.

This limits network overhead, CPU consumption and improves search times and transmission times. Additionally, this amplification search pattern is reusable in that it can be conducted to search for multiple characteristics, such as contrast, color, metrics pertaining to the contiguity of other metrics, etc. In one embodiment, the parameters for tracking the multiple characteristics are tunable while the technique remains the same.

Figure 5:
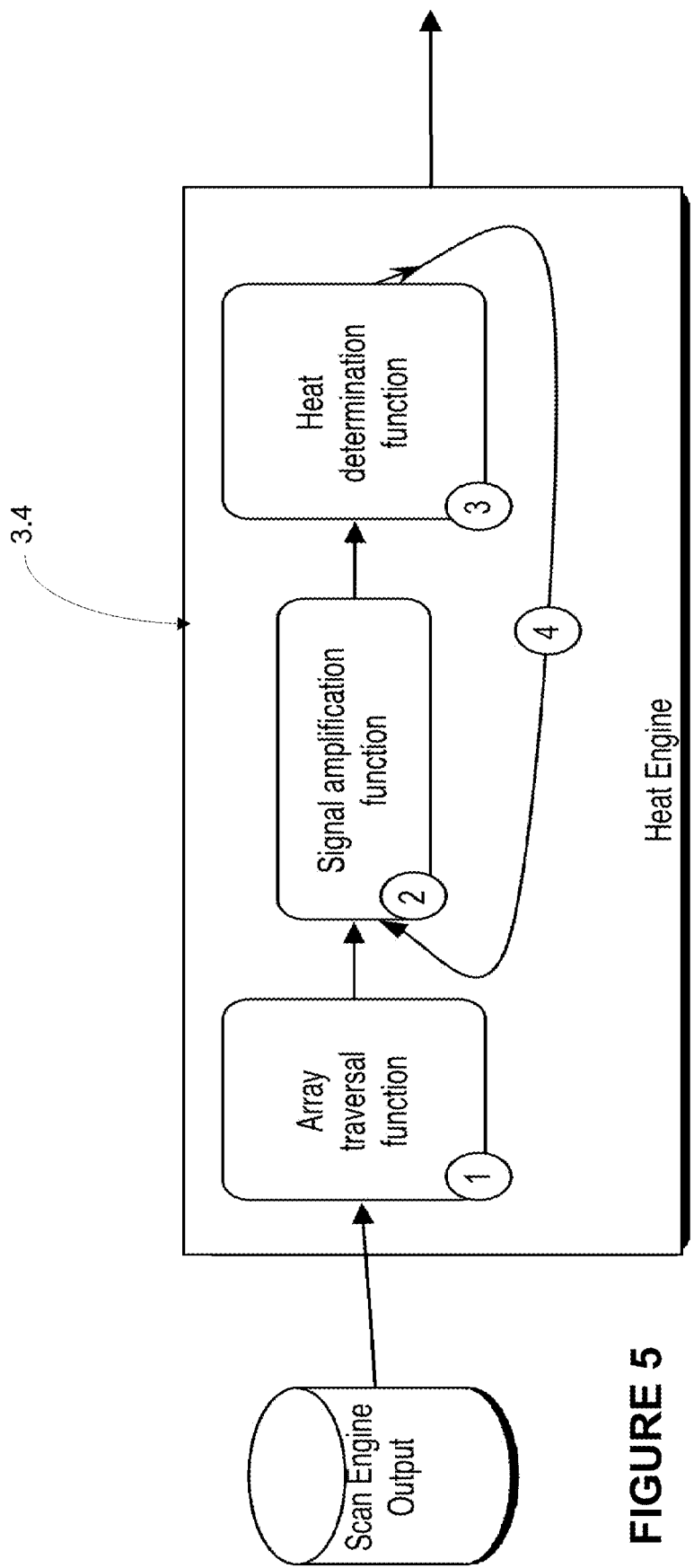
FIG. 5 is a block diagram defining process flow within a heat engine used in the remote access and control of a computer system, in accordance with an embodiment of present invention.

FIG. 5 illustrates the function of the Heat Engine (3.4). In detail, the Heat Engine (3.4) tracks, gathers and analyzes the changes in the time-based array (3.3) updated by the Scan Engine (3.2) and uses a filter, such as an array traversal filter (5.1), to group the changes into time-based buckets. The analysis can be a single derivative of time, or multiple derivations to establish trending traits. The groupings are sent into a signal amplification algorithm (5.2) to tunnel into the changes to a sufficient level ("sufficient" determined by a heuristic algorithm) and the nature of the heat and pixel detail level are established using heat determination function (5.3). This analysis will loop through the amplification process (5.4) for each of the heat areas identified by the Heat Engine (3.4). Additional looping (5.4) may occur for different attributes of heat, including color/contrast, activity, etc., until analysis is complete. The results of the analysis from the Heat Engine (3.4) are maintained in a repository, such as an areas-of-change database (3.5) and handed off to both the Context Engine (3.6) and the Logic Engine (3.7). In one embodiment, the output from the Heat Engine (3.4) is fed to a Context Engine (3.6).

Figure 6:
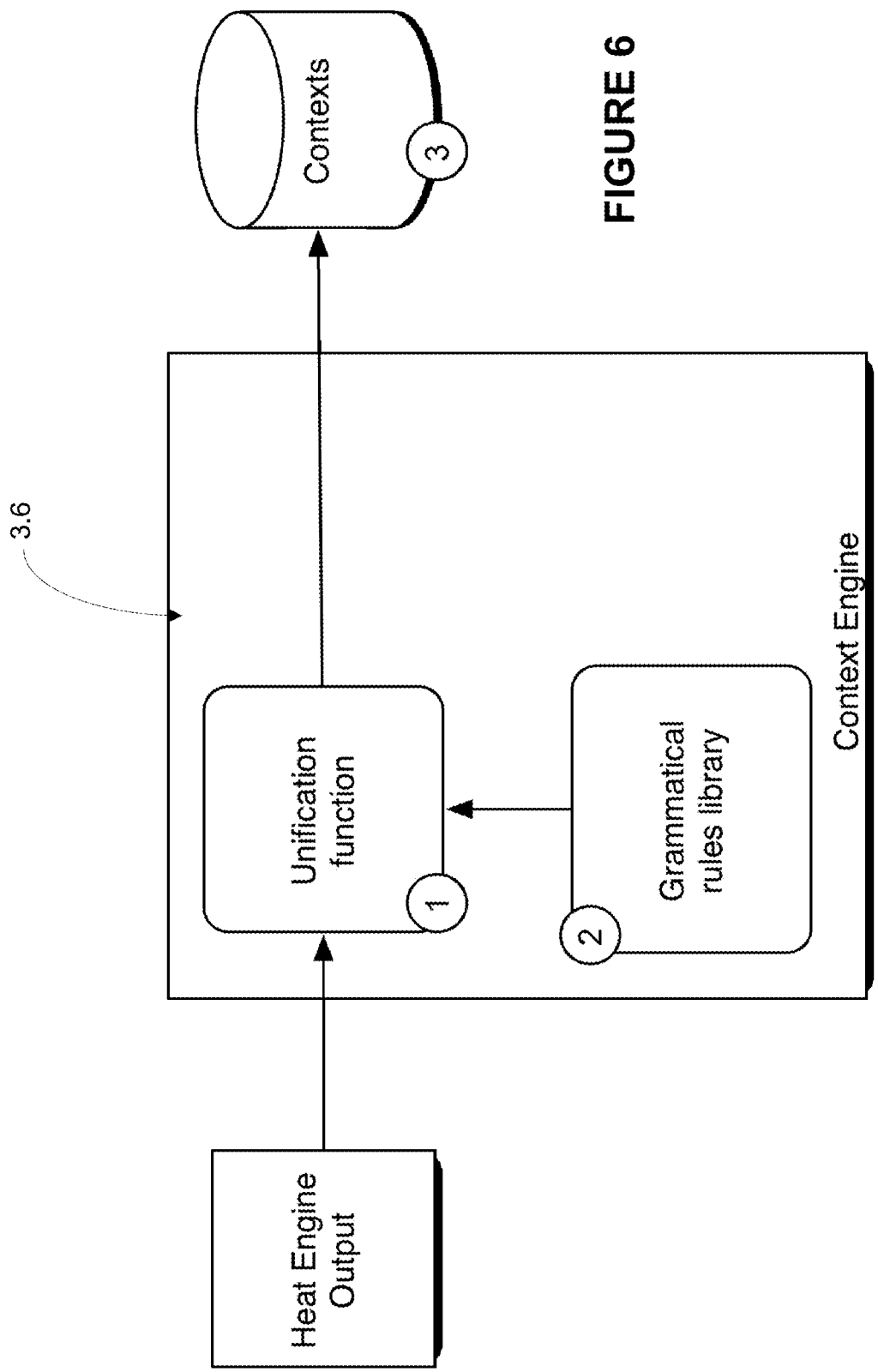
FIG. 6 is a block diagram defining process flow within a context engine used in the remote access and control of a computer system, in accordance with an embodiment of present invention.

Referring back to FIG. 3B, the Context Engine (3.6) picks up the output of the Heat Engine (3.5) and looks to identify contiguous areas of activity and identify the border or any other identifying characteristics of the region. The function of the Context Engine will now be described with reference to FIG. 6. The Context Engine includes logic to evaluate the Heat Engine output to determine if contiguous areas can be identified by both activity and contrast and treated as a frame with special conditions. In one embodiment, the Context Engine (3.6) utilizes unification algorithms (6.1) and uses proprietary crafted grammatical rules based on geometric principles, color contrasts and time (6.2) available in a grammatical rules library available to the Context Engine (3.6) to look for meta patterns amongst the multivariable data set. In one embodiment, it is desirable to afford full boundary discovery balancing the best bandwidth, best experience (no tearing) and best central processing unit (CPU) performance (singular unified compression setup/teardown) among other variables to make choices for out-of-band treatment or other techniques. In one embodiment, the Context Engine (3.6) performs the analysis on smaller frames and is configured to assemble a larger frame by stitching smaller frames together to treat as a contiguous entity.

The Context Engine (3.6) takes into account contrast differences in the regions adjacent to the activity. The Context Engine (3.6) also looks at the levels of activity over time to determine likelihood of persistence and establish the value of handling the activity with alternate techniques. The output of the Context Engine is maintained in a Context array (6.3).

Referring back to FIG. 3B, a logic engine (3.7) analyzes the output from various sources and determines which technique to employ for compression and transmission of the data in the framebuffer. The Logic Engine (3.7) takes feeds from multiple sources, such as the feed (3.8) from the Heat Engine, feed from the Context Engine (3.9), information from the initial handshake (3.14) (information about the type of client, the size of the connection and the bit depth to weight the contrast analysis against) and an ongoing quality of connection feed (3.15) from the client along a backchannel.

Figure 7:
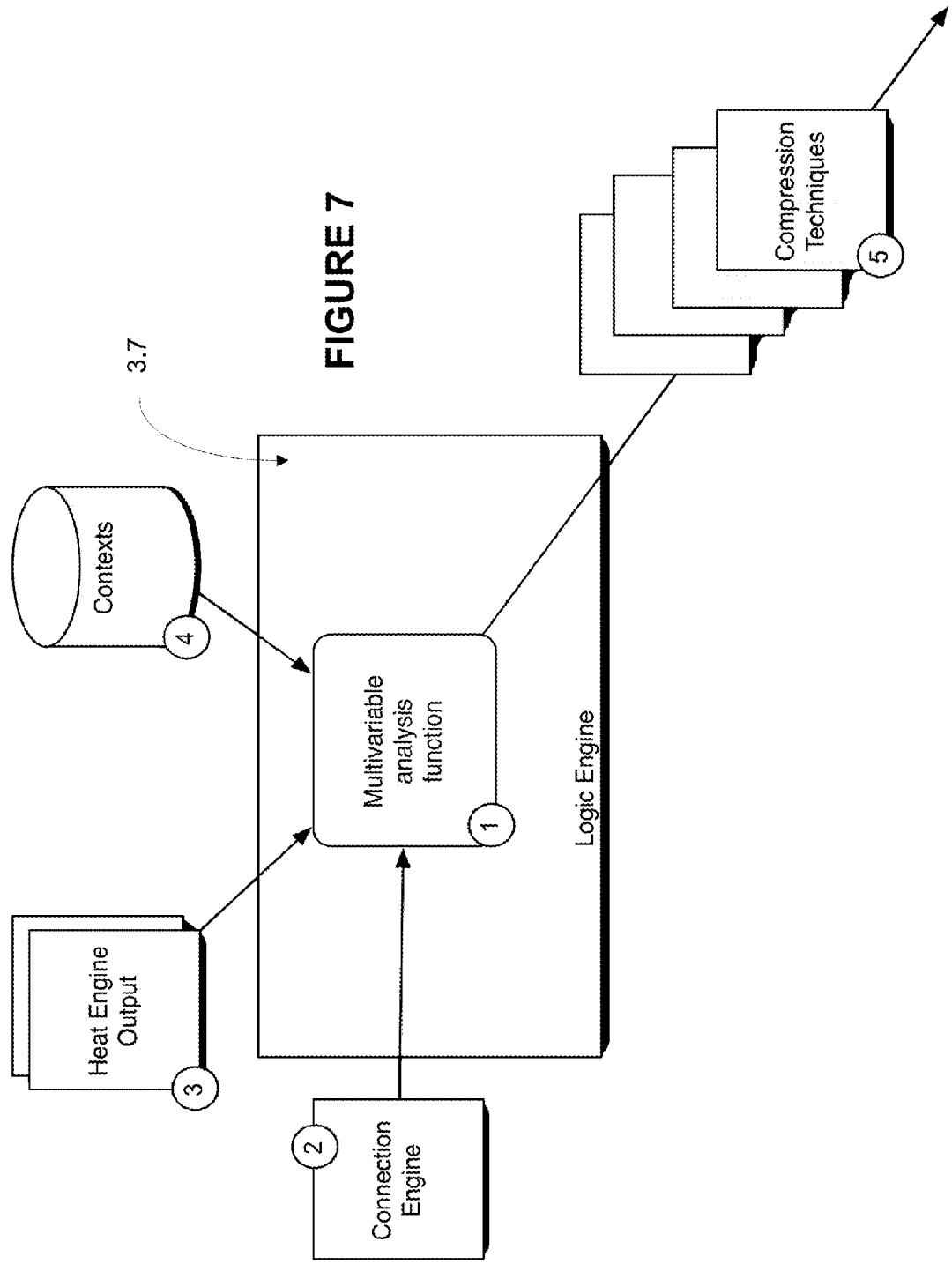
FIG. 7 illustrates a block diagram defining process flow within a logic engine used in the remote access and control of a computer system, in accordance with an embodiment of the present invention.

The function of the Logic Engine (3.7) will now be described with reference to FIG. 7. The Logic Engine (3.7) takes the output from the Connection Engine (7.2), the Heat Engine (7.3), Context Engine (7.4), and performs a multiple variable analysis using analysis function (7.1) to balance the needs of server-side performance, client side user experience and network consumption efficiencies. In one embodiment, the Logic Engine relies on a list of compression techniques (7.5) available to select an optimal technique for compressing the data in the framebuffer.

The algorithm provides an efficient way for refreshing/recovering data. The image data packets generated by the algorithm include data that is correlated to a specific portion of an image of the virtual machine display and is assigned to render the specific portion of the image at the client. As mentioned earlier, the data in each image data packet is comprised of relatively simple grammar that defines a specific portion of the image of the virtual machine display. Due to simplified grammar of the generated image data packets, it is possible to retransmit missing packets in a precise and focused way. In the prior art, refreshing a display at a client would require transmitting a stream of packets holding graphics instructions and image data. With a complex grammar, the image data sent in each packet can be related to a series of other packets in order to describe the full set of instructions that the display drivers at the client need to decode the packets to render the image. In many cases, the refreshing of a display region or part will require obtaining multiple packets to update the entire display, as packets are not pre-assigned or correlated to any specific portion or part (e.g., a specific pixel or pixels) of the display.

The algorithm, thus, enables optimization of the network/computing resources and the time for transmission/rendering of the framebuffer data to the client by reducing the amount of data transmitted while maintaining quality of the image rendered at the client. Stated further, the algorithm enables refreshing or retransmission of particular ones of packets that are correlated to those regions of the display screen that needs to be refreshed or updated. Although the whole display will be updated or refreshed periodically, when full refresh or updates are not required, the bandwidth saved by not transmitting packets for areas not needing refresh can be substantial. It should be noted herein that the client includes the necessary logic to read the image data packets received from the algorithm, strip the packaging information, decode the data contained therein, map the data to appropriate portions on the display of the client and render the appropriate portion(s) on the display of the client based on the mapping of the decoded data. In one embodiment, the logic in the client is able to process all the data in the image data packets without requiring local display driver of the client to process any of the data through its programmed routines. In another embodiment, the logic within the client is able to process the data in the image data packets with the local display driver of the client providing some amount of processing through one or more programmed routines. The part of processing required by the local display driver may include mapping of data to specific portions of the client's display or mapping of color, etc.

Figures 7A, 7B, 7C:
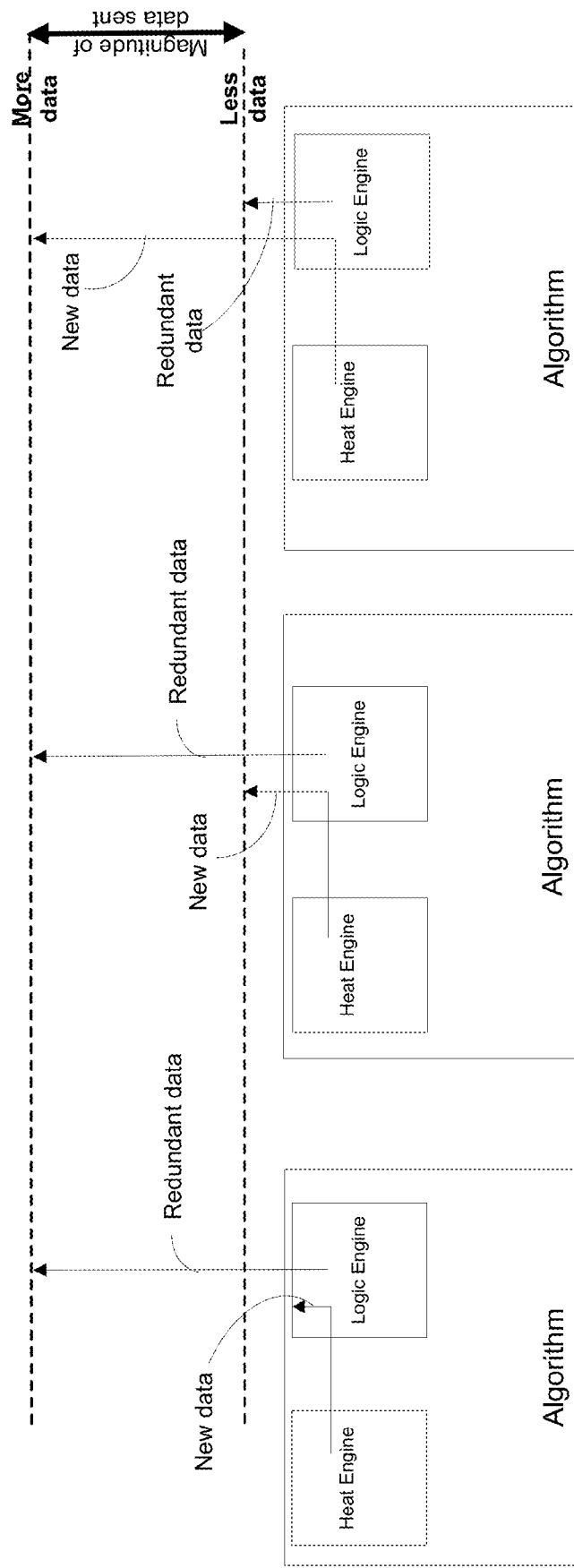
FIGS. 7A, 7B and 7C illustrate block diagrams depicting management of framebuffer data.

There could be any number of reasons why only a subset of data needs to be transmitted. Some of the reasons may include loss of data due to poor connection, data refresh due to high activity in specific portions, periodic refresh due to very low or no activity, etc. The algorithm may use the output from the Heat Engine and the Logic Engine to identify levels of activity in a specific portion of the framebuffer data in order to provide the necessary data to the client. FIGS. 7A-7C illustrate some examples wherein specific image data packets are transmitted in order to refresh the specific portion of the VM display at the client. It should be noted herein that initially all the data from the framebuffer representing the image of the VM display is transmitted to the client for rendering. After the initial rendering of the image of the VM display, specific portions or all of the data may be refreshed/updated periodically. In one embodiment illustrated in FIG. 7A, the data for a specific portion of the VM display is transmitted periodically to refresh the data at the client. This might be due to the fact that there is no activity recorded for the framebuffer data at the respective VM. As a result, there is no new data available for transmission to the client and only stale, redundant data is re-transmitted for refreshing the specific portion of the image that is already rendered at the client. This will be done in an order of the most stale data first. In FIG. 7B, the data transmitted may include some new data and mostly stale, redundant data. For instance, the new data for a specific portion of a VM image display may be associated with a blinking cursor on an application screen, such as a Microsoft™ Word document, and the redundant data may be data associated with the stale portions of the display image. Similarly, in FIG. 7C, the data transmitted for a specific portion of the image may include mostly new data and only some stale, redundant data. For instance, the new data may be associated with a timer on an application screen and the stale, redundant data may be part of the remaining portion of the image that has not changed. The magnitude of each arrow in FIGS. 7A-7C illustrates the amount of the respective data that is transmitted to the client. Due to the correlated nature of each image data packet sent to the client, only relevant data to refresh/recover can be sent without having to send data for the entire image. The bit map data assigned to a specific portion of the VM's display image that is sent through the image data packet enables refreshing/recovering the specific portion of the data without requiring the remaining data to be refreshed, thereby reducing the latency and network/computing resources.

Referring back to FIG. 3B, the quality of connection backchannel (3.15) is a UDP stream of information that watches the packet headers of received packets and reports on jitter, loss and out of order information of the packets. Additionally, the UDP stream watches for significant, persistent adjustments of latency, bandwidth and loss and reports them to the Logic Engine (3.7), as well. In one embodiment, the Logic Engine (3.7) has a set of predetermined logic/functions that it calls on to deliver the various types of the framebuffer to the client. These functions are a combination of compression/transmission techniques (3.10) that are used in specific combination based on the stimuli ascertained from the various feeds. In one embodiment, the Logic Engine (3.7) takes into account various parameters and characteristics associated with the connection and client via the multiple variable analyses.

For instance, during the analysis phase, the Logic Engine takes into account: (a) The type of client. Some clients can handle out-of-band multimedia, others cannot. Mobile phones, desktops and OSs have impact on the ability to process and buffer network behaviors in different ways. As a result, the technique used takes into account the network behaviors and format the outgoing stream of framebuffer data accordingly. Additionally, some of the decompression algorithms can be too weighty for certain clients, and alternative techniques need to be employed; (b) the type of connection. Certain networks have both latency and jitter characteristics that can change the nature of the techniques that need to be employed; (c) the activity level and size/scope of the region. Block sizes with compression techniques would be employed under different conditions to accommodate size/scope of the region. In addition, the choice of lossy versus lossless compression would be employed under different conditions; (d) the color distribution of the region. The Logic Engine may use random samples to ascertain the complexity of the color field and employ different compression techniques for a page of text versus an image versus a consistent color. The Logic Engine will also utilize Poisson distribution algorithms as a balancing agent to identify areas of random singularities to avoid error; (e) the image analysis to employ techniques to match up to human visual perception tolerance; (f) scenarios where some techniques hit diminishing returns or high inefficiency levels (example: compression that yields larger payload than the original) and adjust techniques; (g) the context engine may identify contiguous areas that can be handled with a layered algorithm. Streaming or out-of-band algorithm can be employed for specific types of framebuffer data; (h) the logic engine is configured to employ a layer identification technique to identify the data stream because other data stream sources could be directed to the client.

The types of compression or techniques that can be employed by the logic engine include (but not limited to): Pixel scanning; trixels (or groups of pixels); bitmap compression (lossy, like JPEG); bitmap compression (lossless, like PNG); squares (variable sizes); rectangles (variable width, heights); uncompressed bitmap; color constant; bitmap caching; and loss management techniques such as stale refresh.

The aforementioned list of the types of compression or techniques employed is exemplary and should not be considered exhaustive or limiting. Other types of compression or techniques may be used so long as the functionality and intent of the compression is maintained in the ecosystem.

The Logic Engine output using the compression/transmission techniques (3.10) is handed to the output engine (3.11), which packages and transmits the packets to the thin client location based upon the location specification provided by the connection engine (3.13). FIG. 9 illustrates the function of the Output Engine 1.11. The Output Engine interacts with the Connection Engine (9.2 or 3.12) using routing destination logic 9.1 to determine the location of the thin client from which the original request was received, the client type, etc. The packets are put on the network with UDP technology and are sized (9.5) with a custom header and packet size (9.6) based upon contents and the client type (3.18) that defines the ability to handle network UDP buffers.

The client receives the packaged framebuffer data and decodes the header and places the information directly (9.7) onto screen frame as directed. The primary principle is to have a very lightweight, low computational client.

Referring back to FIG. 3B, the client sends its mouse clicks and keyboard strokes (3.16) via a UDP stream to the OS session based upon the connection information gathered during the initial handshake (3.14) with the Connection Engine (3.12). Additionally, keyboard strokes/mouse clicks are also sent to the Scan and Heat Engines (3.20) to provide efficient hints on likely areas of change.

Figure 10:
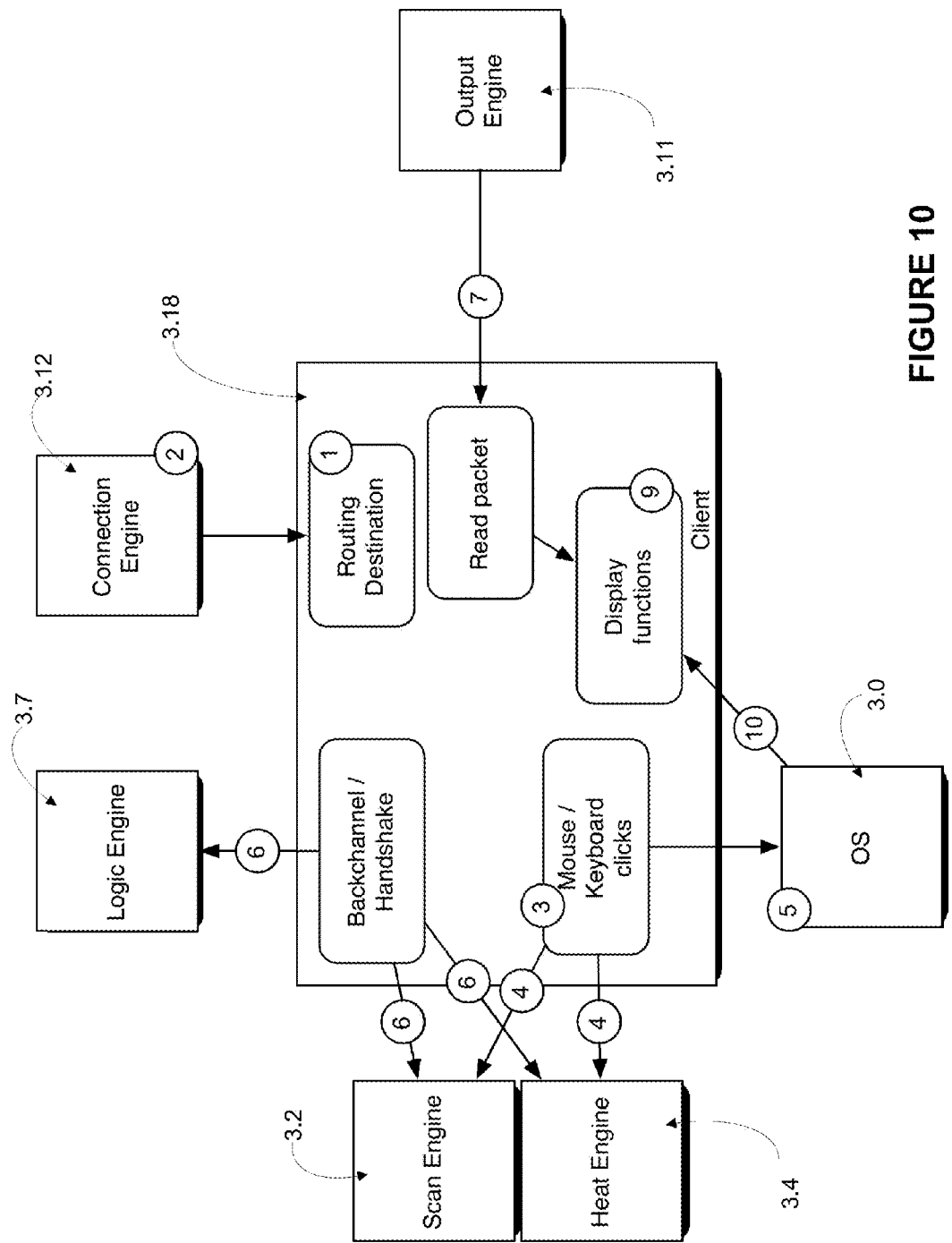
FIG. 10 illustrates a block diagram of a thin client interacting with various components of a image processor algorithm, in accordance with an embodiment of the present invention.

FIG. 10 illustrates examples for fine tuning/updating of the captured image through back-and-forth interaction between the thin client and the algorithm on the VM within the virtual environment. Specifically, mouse clicks and keyboard strokes (10.3) identifying likely areas of change are sent (10.4) from the client to the Scan Engine (3.2) and the Heat Engine (3.4). In one embodiment, the Scan Engine can be prompted to come out of hiatus to scan user input based on detected mouse clicks and keyboard strokes, and a Heat Engine may choose to add artificial heat to an active area by clicking/typing to ensure a positive experience for the user. Thus, the algorithm fine-tunes the captured image by identifying likely areas of change based on input from the client, monitor activity at these areas, generate deltas of change and forward the fine-tuned information to the client for rendering.

The client receives re-directed framebuffer data (10.7) from the output engine (3.11) in packets based on the routing destination (10.1) that is exchanged between the client and the connection engine (3.12) and provided in the connection parameters obtained during initial handshake (10.2). The packets are decompressed and rendered using display functions available at the client (10.9). The client may also receive a direct stream of out-of-band multimedia streaming (10.10 or 3.17) from the OS (3.0) which can be decoded directly on the client OS and overlaid onto the screen (10.9) associated with the client where the data from the framebuffer is already rendered.

In one embodiment, in addition to the usual interactions between the client and the one or more modules of the algorithm, the client interacts with the Logic Engine 3.7 to exchange information associated with quality of connection through the backchannel handshake, which is also forwarded to the Scan Engine and the Heat Engine 10.6. Additionally, backchannel communication is also used by the client to forward updates to the connection state, such as dynamic changes to the connection parameters including changes to the display device of the client or addition of one or more display devices at the client. In addition to the updates forwarded to the scan engine and heat engine, the client also forwards user interactions to applications running on the VM. The user interactions are received by the scan engine and forwarded to appropriate clients through the OS of the VM.

In one embodiment, two-way multimedia streaming communication can occur through same mechanism as mouse/keyboard and the streaming technique. An example of video would be a local display through a local driver on the client (for user feedback) via a layering technique—that will interact with the client to be attached into correct source layer—and streaming back to the OS for consumption and processing.

This feature is designed on the principle of federation, with multiple sources providing experience to the same client. To do so requires that each source stream have a layering identification, so that out-of-band streams can be reintegrated with the parent layer. Additionally, although multiple sources can be directed at a client, the client may only choose to interact solely with one source at a time. Therefore the client needs to have the ability to communicate the desired status of a source at any point in time (3.19). The scan engine and all downstream services are also configured to conserve resources by halting scanning of the framebuffer when in a de-prioritized state.

Also, certain new mobile client operating systems, such as the Android™ mobile phone OS, include constructs for keeping the base communication protocol alive yet segregating and disconnecting the screen activity.

Similarly, in one scenario, a signal (3.19) can be sent to the Scan Engine to de-prioritize the scan, thus saving both server-side and bandwidth resources. One example may be the client is subscribed to a cloud-based hosted desktop service, and at the same time, is consuming a DVR entertainment service from a separate cloud. Depending on what is visible on the screen, each cloud service may not be processing the respective framebuffers if the service is not visible on the client. FIG. 2F, discussed earlier, illustrates the concept of selective display of framebuffer information. The client would communicate the need for processing based upon the layer logic. Another example could be a hosted desktop service delivered to the client with advertisement based layers being placed on the screen, depending on the circumstance of the desktop and the advertisement rules engine of the desktop provider.

Figure 13:
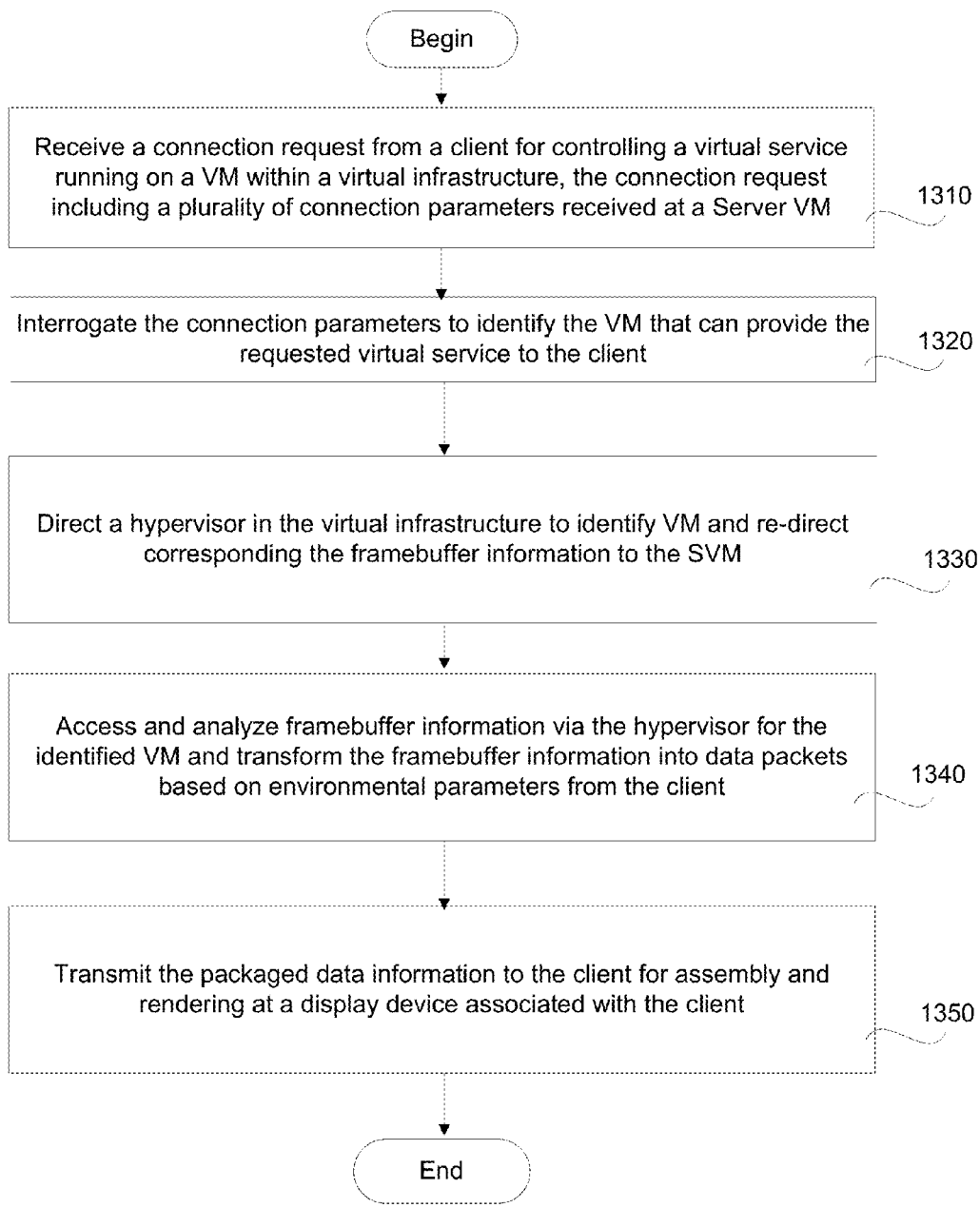
FIG. 13 illustrates a process flow diagram of various steps involved for controlling a virtualized computer service from a remote client, in one embodiment of the invention.

With the above detailed description on the workings of the algorithm, a process flow identifying the various process operations will now be described with reference to FIG. 13. The process begins with a request for connection to a particular VM received from a client, as illustrated in operation 1310. The connection request is for accessing and controlling a virtual service running on the VM and includes a plurality of connection parameters that define the connection requirements of the client. The request is received at a virtual machine, which is executing an image processor algorithm. The virtual machine with the algorithm may act as a server virtual machine accessing and managing framebuffer data of the other VMs running on the hypervisor, in one embodiment. The algorithm interrogates the connection request to identify the service and the location information, as illustrated in operation 1320. Based on the interrogation, the algorithm identifies a specific VM from among a plurality of VMs running on the hypervisor, which will provide the service requested by the client. The algorithm then directly accesses framebuffer information of the identified VM at a predetermined location in memory through the hypervisor on which the plurality of VMs are executing. The framebuffer defines a graphical output that represents an image of a virtual machine display associated with the VM. The algorithm at the SVM reads the framebuffer data defining an image and processes the framebuffer data into image data packets based on the connection parameters obtained with the initial connection request from the client, using a formatting protocol contained within the algorithm, as illustrated in operation 1340. The packaged image packets is forwarded to a network interface card (NIC) at the SVM where the image packets are further packaged to comply with a transmission protocol and transmitted to the client for rendering at a display device associated with the client, as illustrated in operation 1350. The rendered client data defines an image of a virtual machine display associated with the identified VM. The client decodes/decompresses the image data packets, assembles the data obtained from the image data packets and renders the assembled data at the client. User interaction, such as mouse clicks and keyboard strokes, at the rendered graphical output can be captured and returned to the algorithm for fine-tuning and control of the VM.

With the above general description of the algorithm, more detailed description of various scenarios/applications that use the algorithm will now be described. It should be noted that the algorithm can be used in a variety of settings including, but not limited to, desktop application, gaming application, consumer electronic application, mobile application, to name a few. The above list of applications is exemplary and should not be construed limiting. Other applications/scenarios that can use the algorithm are possible. It should also be noted that the overall function and interaction of the algorithm with the various components remains the same under all scenarios/applications. Only the ways to access and use the algorithm will differ as will be discussed in the following sections.

Desktop Application:

Desktop services are provided through a computing device, such as a personal computer (PC), desktop, laptop, etc. The embodiments of this application use the algorithm embodied in a Server VM (SVM) through a desktop using network connection, such as the Internet. It should be noted herein that although the algorithm is construed to be embodied in a SVM, the term "server" is used just to illustrate that the SVM with the embodied algorithm behaves like a server in a client-server computing by providing the service requested by the client. The SVM may behave as a client seeking information from other VMs, which may then take on the role of the server. The algorithm may be embodied on any VM available in the virtual infrastructure. In one embodiment described in FIG. 12A, the client is a desktop, such as a PC or laptop. To begin with, the desktop connected to the network, such as an Internet, sends a connection request to a virtual center (VC) for access and control of a virtual service available within the VC. The connection request includes identity of the desktop along with other connection parameters. The desktop is first authenticated using the identity and other authentication information provided in the connection request prior to providing access to the virtual service. In one embodiment, the desktop is authenticated through a website, which maintains a list of authorized devices that can access a virtual infrastructure (VI) cloud associated with the virtual center and available on the Internet, using the identification information of the desktop obtained from the connection request. The aforementioned process of verifying the identity of the desktop is just one way of establishing the authentication and other ways of establishing the authentication can be used. After authentication, the connection request from the desktop is sent to a SVM that runs alongside other VMs in the VI. The image processor algorithm within the SVM interrogates the connection parameters to obtain identity of the desktop, type of the desktop, type of display device associated with the desktop, identity of a virtual service requested, operating system (OS) running on a VM providing the service, the protocol used to interact with the OS of the VM, and other connection requirements of the desktop. Thus, the connection parameters provide connection and other environment-related information associated with the client and includes type of desktop, origination Internet protocol (IP) address of the client, destination IP address for the virtual service, type of client, client identification information, type of display device associated with the client, OS running on a VM providing the virtual service, protocol used to interact with the OS of the VM, amount of bandwidth available, location of the device in terms of latency, quality of the connection, etc.

The algorithm performs the process of connecting the desktop to the appropriate VM by identifying a VM that can service the connection request from the desktop, determining the scan rate at which the OS refreshes the framebuffer data at the identified VM, etc., so as to appropriately interact with a hypervisor upon which the plurality of VMs of the VI are running to gain access to the framebuffer data associated with the identified VM. The hypervisor includes a virtual graphics card that interacts with the graphics driver of the VM to write the framebuffer data for the identified VM into a pre-determined location in the virtual memory accessible through the hypervisor.

The algorithm in the SVM accesses and reads the framebuffer data for the identified VM from the predetermined location in the virtual memory directly through the hypervisor. The algorithm uses an appropriate Application Programming Interface (API) to interact with the hypervisor when accessing the framebuffer data. The APIs are specific to specific hypervisor and the algorithm has the intelligence to determine the appropriate API to use for a specific hypervisor based on the connection parameters. The algorithm then reads and analyzes the framebuffer data using the scan engine, heat engine, context engine and logic engine and generates image data elements (packets) with packet size that are specific and suitable for the desktop using one or more techniques based on the connection parameters and forwards the packets to the client using a simple and generic transmit protocol, such as UDP. The image data packets include message type and packaging information that complies with both the algorithm requirements and transmission protocol requirements.

The desktop receives the packets, reads the message types and uses appropriate de-compression techniques to read and render the framebuffer data on a display device at the desktop. The rendered data represents the portion of an image of a virtual machine display of the identified VM showing graphical elements, icons, displays, programs, links, pictures, movies, and user interface manipulation or non-manipulation that is executing or is rendered at the VM. User interactions and automatic feedbacks at the rendered framebuffer are received, packaged and transmitted by the client-side logic of the algorithm to the SVM. The user interactions can include changes/updates to the connection parameters and framebuffer data that enable fine-tuning and updating of the framebuffer data. The user interactions are similar to the interactions performed by an administrator at a console associated with the VM during routine trouble-shooting or maintenance. The automatic feedback provides the algorithm in the SVM with quality of connection information and data directed towards one or more application executing on the VM, which provided the service in response to the connection request. The user interaction and automatic feedback information are transmitted back to the algorithm through a backchannel communication. The interactions between the VM and the client through the hypervisor and the algorithm enable a user to control one or more services at the VM.

In another embodiment, a laptop acts as a client that requests a connection to a VM in the virtual environment. The process of establishing connection to the VM for the laptop is similar to the embodiment discussed above with reference to the desktop application. In this embodiment, the framebuffer data is configured and is specific for the display device associated with the laptop based on the connection parameters established during the initial handshake of the client with the algorithm.

In one embodiment of the invention, an image processor algorithm provides access to a computing profile of a user. Computing profile, as used in this application, refers to a computer system configured for a specific user on which specific applications and hardware are available/executing. Accordingly, the computing profile of a user may include a customized desktop that a user has configured with specific hardware devices and software applications. In this embodiment, the connection request is used to access this computing profile of the user so that the user can control the hardware/software through a client over a network. The client, in this embodiment, may be a mobile device or any other computing device, such as a desktop PC or a laptop computer either co-located or remote that is connected to a network. When a client initiates a connection request, the client is first authorized by a user authentication service. Upon authentication, the client is allowed access to the virtual center and to the algorithm running on a VM within the virtual center. The algorithm provides access to the service by providing access to the framebuffer data representing an image of the computing profile of the user.

In another embodiment of the invention, the algorithm provides user access to a specific session of a specific VM. In this embodiment, the access to a specific session is provided by accessing a framebuffer data for the specific VM using a hypervisor and an image processor algorithm. In one embodiment, establishing a session with a VM provides access to a user's computing profile or desktop. The profile can define the views of a user's desktop, folders, data, applications, and services accessible through the user's profile. During the session, the user can access and utilize all of the interfaces of the profile as if the user were local to his desktop or computer. During the session, the user will be able to communicate all I/O input (e.g., keyboard entries, mouse entries, user interface entries, etc.) using the back channel, as described herein. During the session, the user will be able to turn his computer (i.e., profile) ON and OFF, leave applications or windows open or closed, leave the session and reconnect with the session.

In one embodiment of the invention, the algorithm allows for dynamic re-sampling and re-sizing of the framebuffer data or connecting to different sized framebuffers to accommodate changes in the size and format of the rendering device associated with the client. Thus, when the display device associated with the laptop is dynamically changed to a different type, including different size, different format, the algorithm at the SVM recognizes the change based on the updated connection parameters and processes the read framebuffer data of the identified VM to provide appropriate image data packets for the read framebuffer data that complies with the requirements of the changed display device.

In another embodiment, the algorithm has the ability to generate multiple sets of image data packets for the different configuration of client devices and can, therefore, control and provide image data packets of different sizes, orientations, bit-depths, etc., based on the interrogation of the boot-up parameters of the client. In this embodiment, the logic in the algorithm may include standard switches to identify the correct set of image data packets with size, format, orientation, bit-depth, etc., specific to the display device associated with the client based on the interrogation of the connection parameters of the client. Every time a client disconnects the connection and re-connects with a new display device, the algorithm recognizes the revised criteria for the framebuffer data based on the new handshake and dynamically generates appropriate set(s) of image data packets representing the framebuffer data with bit-depth, size, orientation, etc., that matches the revised criteria. Some of the criteria considered for re-sizing may include bit-depth, size, orientation, format, to name a few. Sometimes, the algorithm will connect to a different framebuffer to better facilitate the interaction. Thus, the algorithm is able to accommodate dynamic re-sizing and re-formatting of the framebuffer data based on the changing requirements at the client.

In another embodiment, the algorithm allows rendering of the framebuffer data of different sizes simultaneously on multiple display devices associated with the client. Thus, if the client is a laptop and uses a display device of a desktop along with the laptop's own screen for rendering, the algorithm enables simultaneous rendering of appropriate sizes of the framebuffer data on both the laptop screen and the display device of the desktop. It should be noted that the compression techniques engaged in formatting the image data packets might use lossless compression or lossy compression. In order to ensure that the algorithm does not extract the framebuffer data while the data is being refreshed, a sync-flag may be used to ensure that the algorithm receives the data only after the refresh of the framebuffer data is completed by the OS.

Figures 1, 12A:
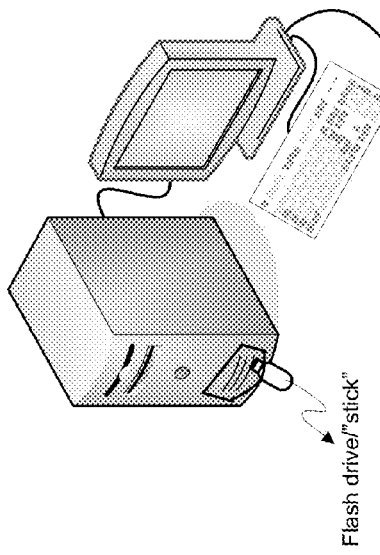
Figures 2, 12A:
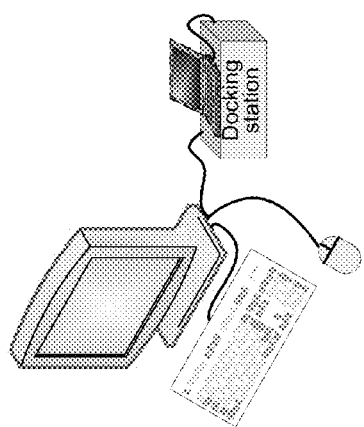

In one embodiment, the laptop may use a docking station to establish a network connection to a virtual service in a virtual center, as illustrated in FIG. 12A-1. The laptop connects to a network through the docking station. A Server VM with an embedded algorithm gets activated when a connection request is received from the laptop and authenticates the laptop based on the connection parameters. The SVM may be part of the virtual center with access to various services/applications running on the VMs accessible through the Internet and the activated algorithm. The virtual center includes all the components that make up the virtual infrastructure including the underlying physical hardware, the hypervisor, a plurality of virtual machines running on the hypervisor with various types of operating systems executing within the VMs.

Figure 12B:
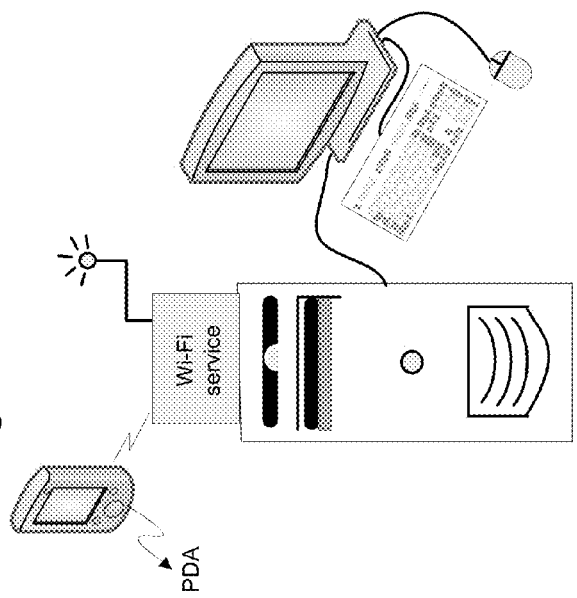
FIG. 12B illustrates a flash drive on a PC for accessing a virtualized computer service within a virtual environment, in one embodiment of the invention.

The algorithm detects dynamic changes to one or more connection parameters at the client and dynamically adjusts the presentation of the framebuffer data accordingly. The algorithm exchanges quality of connection information with the client, such as the desktop or the laptop, through a back-channel and fine-tunes the framebuffer data by interacting with the hypervisor to be in line with the quality of connection. In another embodiment, a software client can be provided on a computer readable medium, such as a flash drive, as illustrated in FIG. 12B. The flash drive with the software client can be plugged into a Universal Serial Bus (USB) port of a computing device, such as a desktop computing device or a laptop-computing device and accessed through the laptop/desktop PC. The software client provides the authentication mechanism to authenticate the desktop PC or the laptop in which the flash drive with the software client is plugged. Upon authentication, the desktop PC or the laptop is provided with a trusted connection to a virtual center that includes a virtual infrastructure with a plurality of VMs executing on a hypervisor accessing the underlying shared resources. The authenticated desktop PC can activate the SVM by generating a connection request to a service and interact with the SVM to obtain framebuffer data from a specific VM.

Figure 12C:
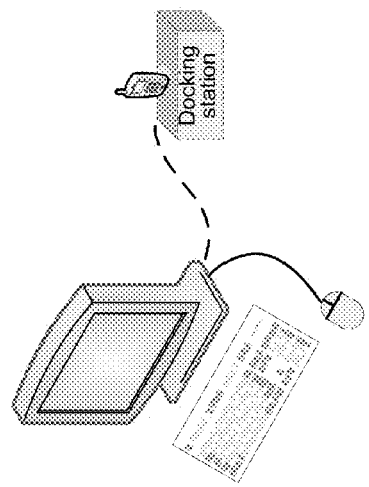
FIG. 12C illustrates a personal digital assistant (PDA) accessing a virtualized computer service within a virtual environment using a wireless fidelity (Wi-Fi) system, in an alternate embodiment of the invention.

In another embodiment illustrated in FIG. 12C, a desktop PC can connect to the virtual center using a high-speed connection, such as a Wireless Fidelity (Wi-Fi) technology available to the desktop PC. In this embodiment, the connection request to a virtual service provided by the desktop PC includes identity of the desktop PC. When the algorithm running on a SVM receives the connection request, the algorithm interrogates the connection parameters provided with the connection request to identify the desktop PC, identify the VM that can provide access to the service requested in the connection request, and the connection requirements of the desktop PC including bit-depth, acceptable scan rate, orientation, etc. The algorithm first authenticates the desktop PC and upon authentication directly access the framebuffer information of the identified VM through the hypervisor, package the framebuffer data and forward the packaged framebuffer data representing an image of a virtual machine display of the VM to the desktop PC using the Wi-Fi connection. The aforementioned embodiments with reference to FIGS. 12A-12C represent some exemplary ways for accessing and controlling the services requested by a client executing on a VM. The services could be a display of the VM running applications that are designed for running on the client.

Figure 11:
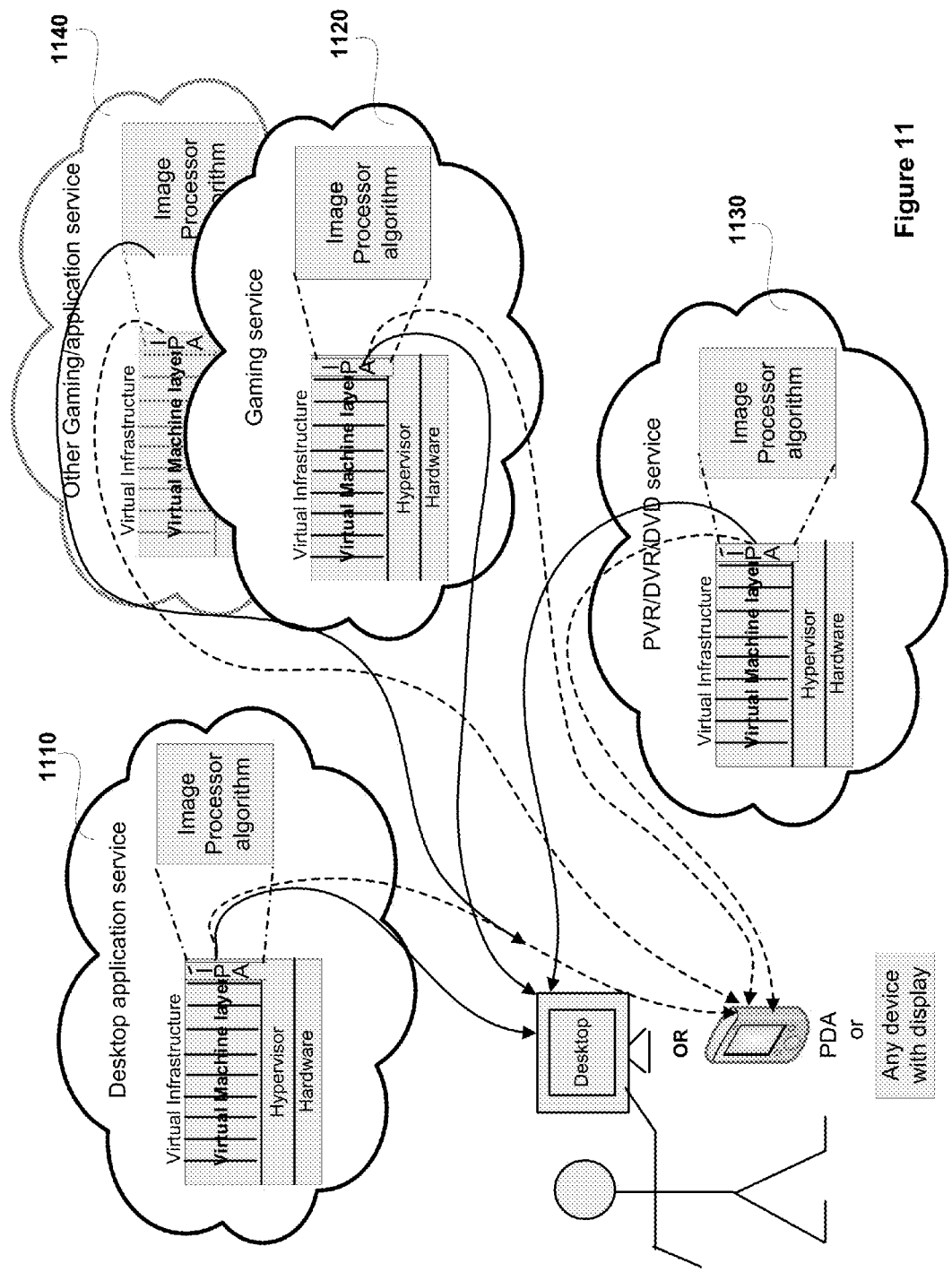
FIG. 11 illustrates a simplified block diagram for accessing virtualized computer services offered in different layers, in one embodiment of the invention.

In another embodiment illustrated in FIG. 11, the algorithm provides a simple and effective tool to access multiple services available at different layers remotely using a single client. The client can be a "thin" client or a "fat" client. In this embodiment, the virtual infrastructure includes a plurality of "clouds" of services. For instance, there could be a desktop application service cloud 1110 providing access to a plurality of desktop applications, a gaming service cloud 1120 with a plurality of online games, a PVR/DVR/DVD service cloud 1130, such as the ones provided by NetFlix™, etc., for obtaining online stream of multimedia content, and other types of gaming/application service clouds 1140. Each of these clouds provides specific types of service for a client to access and control. The above list of service clouds is exemplary and should not be considered limiting. Other types of service clouds can be used with the embodiments of the invention. Each of the cloud has its own virtual center with a plurality of VMs running on a hypervisor and accessing underlying hardware. A image processor algorithm (IPA) is provided at each of the clouds in at least a VM. In one embodiment, the IPA is provided at a separate server VM (SVM). In another embodiment, the IPA is provided at a few VMs within each service layer. The IPA can be available in all the VMs within each service layer, in another embodiment.

In one embodiment, a client, such as a desktop, can access the applications/services at each of the clouds by accessing the appropriate IPA. The process begins with a client generating a connection request. The connection request includes a plurality of connection parameters that define connection criteria and environment associated with the client. Included in the connection parameters is service layer identification information that identifies the service layer and the specific service that the client is trying to access. The algorithm interrogates the connection parameters to identify the specific service layer related to the requested service and a specific VM that provides the requested service. For instance, the requested service may be an application within the desktop application service cloud. Once the requested service layer and VM are identified, the algorithm directly accesses the framebuffer data for the requested service of the identified VM in the identified layer through the hypervisor, analyzes the framebuffer data and generates packets of image data in the format specified by the client. The generated packets are packaged according to formatting algorithm and network requirements and transmitted to the client for decoding, processing, assembling and rendering. The algorithm allows the client to manage the service through the rendered framebuffer.

When the client desires to access a different service within the same cloud, the client just terminates the existing connection and generates a new connection request. The algorithm detects the new connection request and interrogates the new connection request, identifies the new service within the same desktop application service cloud 1110, for instance, and provides the framebuffer data in the form of image data packets for the requested service from a VM, which may be the same VM or a different VM within the VI of the desktop application service cloud. The image data packets are provided in the format specific to the client.

Along similar lines, when the client wants to access a different service in a different cloud, such as a Gaming service cloud, then the client terminates the existing connection with, for instance, the desktop application service cloud 1110, and establishes a new connection request with the new service, such as an online game application within the Gaming service cloud, provided in the connection parameters. The algorithm detects the new connection request, interrogates the request to obtain the new connection parameters, establishes connection to the new game application within the gaming application cloud 1120 using the new connection parameters, obtains the framebuffer data for the new game application using the hypervisor at the gaming application cloud 1120, packages the framebuffer data into packets that is compliant with the requirements of the client based on the connection parameters and transmits the packaged framebuffer data to the client for rendering. As mentioned earlier, multiple formats of the framebuffer data with different display requirements may be generated dynamically for the same framebuffer data upon request or during the initial creation of framebuffer data and provided to the client as and when required. The algorithm thus provides ways to switch from one type of service in one application service cloud to another type of service in another application service cloud without having to engage proprietary protocols/software or different clients.

It should be noted that the above embodiments provided details of accessing a service from a specific layer and rendering the information associated with the service at the client, at any given time. However, the embodiments are not restricted to providing access to just one service at any given time but can be extended to provide multiple services from multiple layers at any given time. Accordingly, the algorithm allows accessing framebuffer information from multiple services in multiple layers using the connection parameters and simultaneously rendering the framebuffer data at the client's display device. The framebuffer data from multiple services is rendered in a manner similar to what has been discussed with reference to FIG. 2F with portions of image construct rendering image data from respective services.

The above embodiments describe an efficient and flexible tool that enables a client to control a VM without directly interacting with any operating system running on the VMs. Since the algorithm is requesting framebuffer data for rendering on a display device and not the actual data from the OS for recreating what is being rendered at a virtual monitor of the VM, there is no need for any proprietary protocols to follow for interpreting the data. Further, the data received from the algorithm is already analyzed for context and appropriate contextual information is included in the image data packets transmitted to the client by the algorithm. As a result, no analysis to interpret the image data is needed at the client thus avoiding big CPU at the client-side. Still further, all interactions between the client and the VM is through the hypervisor and not directly with the OS of the VM. The algorithm and the virtual video driver within the hypervisor ensures receiving the framebuffer data from all VMs in a specified format so as to make interpretation of the framebuffer data at the client simple and easy. This enables even a very thin client to be able to access the framebuffer data using appropriate de-compression methods making this a very flexible tool-set for accessing and controlling VMs. Further, the algorithm uses a very generic and simple transmission protocol, such as user datagram protocol (UDP), etc., enabling transmission of the framebuffer data over long distances. The combination of the specified format and the simple transmission protocol enables retransmission in a fast easy way, enabling the algorithm to have latency insensitive and loss-insensitive characteristics. It should be noted that the embodiments of the current invention provide ways to allow applications to continue to execute in the VI "cloud" while providing tools to access and control these applications remotely. One skilled in the art can easily visualize these and other advantages of the current embodiments.

Mobile Applications

In addition to the desktop applications, the current teachings can be suitably used with Mobile devices for accessing applications/services that are geared towards mobile devices. The mobile devices maybe construed as thin clients and can be envisioned as pocket-sized computing devices having a touch-input display device or a display device with mini-keyboard and having very limited computing resources. The mobile device encompasses a wide range of consumer electronics, such as Personal Digital Assistants (PDAs), Smartphones, Tablet PCs, to name a few. The above list of mobile devices is exemplary and should not be considered limiting.

The present-day mobile devices are multi-functional devices capable of tapping into a virtual environment wherein a wide range of applications are hosted, such as e-mail, instant messaging, text messaging, Web browsing, etc. However, access to such applications in their rich client forms would result in a mobile device that requires a large processor to de-compress the proprietary application data so as to provide access to the data and to the VM that provides the data. A large computer-intensive requirement of a processor within the mobile device would be expensive providing a constant challenge to the mobile device manufacturers for balancing efficiency with design. Additionally, as more and more applications are made available for the mobile devices, the demand on the processor becomes greater, making balancing of the applications against computing resources a very delicate and difficult task.

In order to avoid the conflict of having to choose a large processor for more applications against efficient design construct, the image processor algorithm may be used to provide an interface between the thin mobile devices and the services/applications running on the VMs. The algorithm enables one to take advantage of the limited resources of the thin mobile devices while providing the ability to access and control a great number of applications/services running on a plurality of VMs within a virtual center. The general functioning of the algorithm has been described in detail with reference to FIGS. 2-10 above. The functioning of the mobile device will be described with reference to FIG. 12A-2.

In one embodiment, the mobile device accesses the service/resource in a VM by connecting to a network, such as the Internet. In another embodiment, a mobile device, such as a Personal Digital Assistant (PDA), enables resources from a Personal Computer (PC) to access a service running on a virtual machine (VM) within a virtual center (VC) available over the network. The PC may be available at an Internet café and be part of a Wi-Fi network or may be a desktop PC with access to the VC through a wide area network connections (WAN). The PC includes an identification tag or information, such as a barcode or a Radio-Frequency Identification (RFID) tag. The mobile device authenticates the PC device over the cellular network after identifying the device. Once the identity of the PC is authenticated, the PC is provided with a trusted connection to the Virtual Center that includes the virtual infrastructure (VI) with a plurality of VMs running on a hypervisor accessing the underlying shared resources. The authenticated PC is directed to establish a session in the VC "cloud" for accessing the applications/services available at the VMs in the VC. As mentioned earlier with respect to Desktop application, the PC may be able to access multiple types of virtual services/applications available in different layers using the image processor algorithm. Thus, using the PC as an access point a user can gain access and control of the plurality of services/applications available at the VMs.

Similarly, in another embodiment, a mobile device, when directly connected to a docking station, with a keyboard, monitor and mouse, acts as a standalone client that requests a connection to a VM in the virtual environment. The process of establishing connection to the VM for the mobile device is similar to the embodiment discussed above with reference to the laptop and desktop application using the docking station. The mobile client would use a Wi-fi network to establish network connectivity and the docking station can supply a constant charge. In this embodiment, the framebuffer data is configured for the display device associated with the mobile device based on the connection parameters established during the initial handshake of the client with the algorithm.

The mobile device session is similar in scope to the one established by the desktop PC or the laptop described with reference to FIG. 2A. The algorithm provides ways to access services/applications remotely. The algorithm has the logic to scan and look at the framebuffer for a specific service obtained from a VM, determine areas of activity and amount of activity in each of the areas of activity and to focus only on those areas of activity while ignoring areas of non-activity. This would enable in conservation of bandwidth and network resources so that only data that has changes are transmitted. The algorithm also has the logic to determine the boundaries for detecting a frame or out-of-band multimedia content and to use specialized techniques for extracting and transmitting such data in out-of-band multimedia stream. When the out-of-band stream is received at the mobile device, the stream is processed and overlaid on a screen associated with the mobile device in a format understood by the mobile device.

The algorithm provides additional formats of framebuffer data for rendering at a mobile device to accommodate display devices other than the one available at the mobile device. The algorithm uses the connection information during initial handshake between the client and the algorithm and provides the appropriately formatted framebuffer data for rendering. Thus, if the mobile device uses a docking station to access a monitor/display device, the algorithm obtains the requirements of the display devices associated with the mobile device and requests framebuffer data formatted to the display requirements of the corresponding display devices. As mentioned earlier, either the appropriately formatted framebuffer data is dynamically generated or a specific format from a plurality of formats already created for the framebuffer data is selected for transmission by the algorithm. User interactions and other feedbacks at the mobile device is recorded and forwarded to the algorithm for fine-tuning and updating.

The current embodiments provide the ability for very thin clients either co-located or non-co-located to access and control the various services/applications available in the VC cloud remotely using network connection. The algorithm provides the framebuffer data in a format that is predictable and hence no proprietary protocols are needed for compressing/de-compressing of the data. All the services are maintained and executed at the VMs and the complex processing and formatting is done locally by the VM executing the algorithm at the VM layer in the VC using the resources available at the VM layer. There is no need for complex processing at the client-side making this a more acceptable and effective solution. Other advantages will become obvious to one skilled in the art.

Gaming Application

In addition to the Desktop applications and Mobile applications, the algorithm can be used in the Gaming Application to provide a more flexible and efficient tool for controlling a gaming application/service. The embodiments of the invention use the functional aspect of the algorithm to provide control of a game application/service available at a Gaming service cloud.

The client, in this embodiment, is any client that is used for any other service, whether it be a PC, a thin client or a mobile device docked, or any other edge device, such as game console, available in the marketplace. A game console, as is well known in the industry, is an interactive computer system that is connected to a display device, such as a television screen or a computer monitor, and produces a video display signal that can be used with the display device to display the video game. In one embodiment, the game console is replaced by a nettop computer, which has low CPU capability and low memory, and uses the resources of the nettop computer to connect to the virtual center of the service cloud, such as the Gaming cloud, using a image processor algorithm available in the service cloud. The nettop computer, as is well known in the industry, is a very small, inexpensive, low-power computer designed for performing basic operations, such as accessing an Internet, accessing a web-based application, etc. A connection request is initiated at the nettop computer for a service/application in the Gaming cloud. The connection request includes the plurality of connection parameters that provides the algorithm with the connection requirements of the nettop. The algorithm uses the connection parameters to identify a VM that provides the service/application requested by the nettop, directly access the appropriate framebuffer data through the hypervisor, generate image data packets in appropriate format defined by the algorithm. The algorithm forwards the image data packets in appropriate packages, driven by the connection parameters, to the nettop in response to the service request. User interactions at the gaming nettop, such as mouse clicks and keyboard strokes, are captured and forwarded to the algorithm for fine-tuning and update through a backchannel. Further, the algorithm receives periodic updates from the nettop regarding the quality of service through the established backchannel. The algorithm uses the quality of service to appropriately package and transmit the framebuffer data and periodic updates to the framebuffer data to the nettop. Other advantages will become obvious to one skilled in the art.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within the scope of the invention.

What is claimed is:

1. A system for providing a service to a client over a network, comprising:
    a) one or more virtual machines configured to run on a virtualization layer, wherein at least one of the virtual machines is executing an image processor algorithm, the image processor algorithm includes logic, which when executed by the processor of the virtual machine is configured to,
        (i) access framebuffer data of a specific virtual machine that includes the service to be controlled, directly from a predetermined location of virtual memory available through the virtualization layer, the framebuffer data defining graphical output representing an image associated with a virtual machine display of the specific virtual machine;
        (ii) process the framebuffer data of the specific virtual machine to generate image data packets with contextual information, the logic for processing is configured to,
            scan the framebuffer data of the specific virtual machine to discern the image of the virtual machine display of the specific virtual machine including any changes in the framebuffer data of the specific virtual machine;
            evaluate the framebuffer data including the changes to identify contiguous areas of activity, the framebuffer data associated with the contiguous areas of activity defining one or more frames of data;
            extract data related to the contiguous areas of activity in to one or more frames;
            package the extracted data associated with the contiguous areas of activity into the image data packets; and
        (iii) transmit the image data packets of the specific virtual machine to the client for presenting on a display device associated with the client.

2. The system of claim 1, wherein the logic to evaluate is further configured to evaluate the framebuffer data to identify changes to one or more pixels of framebuffer data, wherein the changes to the one or more pixels represent activity in non-contiguous areas of the framebuffer data.

3. The system of claim 1, wherein the logic of the image processor algorithm is configured to,
    (iv) detect a connection request from the client for accessing and controlling the service available at the specific virtual machine; and
    (v) interrogate the connection request to identify the specific virtual machine that provides the service,
    wherein the service is a virtualized computer service.

4. The system of claim 1, wherein the contiguous areas of activity relate to one or more characteristics of the framebuffer data.

5. The system of claim 4, wherein the image processor algorithm includes a search algorithm configured to,
    track presence and location of contiguous areas of activity associated with a specific characteristic within the framebuffer data and ignore areas of non-activity for the specific characteristic within the framebuffer data.

6. The system of claim 4, wherein the search algorithm is configured to,
    track presence and location of contiguous areas of activity for a plurality of characteristics and ignore areas of non-activity for the respective ones of the characteristics of the framebuffer data.

7. The system of claim 5, the search algorithm includes parameters that can be tuned to track presence and location of contiguous areas of activity for the specific characteristic.

8. The system of claim 4, wherein the logic to evaluate framebuffer data is configured to,
    evaluate portions of the framebuffer data to identify contiguous areas of activity associated with one or more characteristics of the framebuffer data and to generate one or more mini-frames of data for each portion; and
    assemble the mini-frames of data from different portions to define the one or more frames of data that are contiguous.

9. The system of claim 8, wherein each mini-frame of data identifies contiguous areas of activity for a specific characteristic within a specific portion of the framebuffer data.

10. The system of claim 4, wherein the image processor algorithm is configured to,
    obtain differences related to one or more characteristics of the framebuffer data in areas adjacent to contiguous areas of activity of the framebuffer data, the differences related to each of the characteristics used in determining levels of activity for the respective characteristic within the contiguous areas of activity for generating the frames of data.

11. The system of claim 10, wherein the image processor algorithm is configured to track the levels of activity related to each of the characteristics within the contiguous areas of activity of framebuffer data, over time, to determine likelihood of persistence of the activity for the respective characteristics within the contiguous areas of activity, the likelihood of persistence used for generating the frames of data for transmission.

12. An image processor algorithm embodied on a non-transitory computer-readable storage medium, the image process algorithm when executed on a processor of a virtual machine within a virtual center is configured to provide a service to a client over a network, the image processor algorithm comprising:

(i) programming logic for accessing framebuffer data of a specific virtual machine directly from a predetermined location of virtual memory available through a virtualization layer, the framebuffer data defining graphical output representing an image associated with a virtual machine display of the specific virtual machine, the specific virtual machine including the service to be controlled;

(ii) programming logic for processing the framebuffer data of the specific virtual machine to generate image data packets with contextual information, the programming logic for processing includes programming logic to, scan the framebuffer data of the specific virtual machine to discern the image of the virtual machine display of the specific virtual machine including any changes in the framebuffer data of the specific virtual machine;

evaluate the framebuffer data including the changes to identify contiguous areas of activity, the framebuffer data associated with the contiguous areas of activity defining one or more frames of data;

extract data related to the contiguous areas of activity in one or more frames;

package the extracted data associated with the contiguous areas of activity into the image data packets; and (iii) programming logic for transmitting the image data packets of the specific virtual machine to the client for presenting on a display device associated with the client.

13. The image processor algorithm of claim 12, wherein the programming logic to evaluate the framebuffer data is further configured to evaluate the framebuffer data to identify changes to one or more pixels of framebuffer data, wherein the changes to the one or more pixels representing activity in non-contiguous areas of the framebuffer data are extracted and packaged into corresponding image data packets.

14. The image processor algorithm of claim 12, wherein the programming logic within the image processor algorithm is configured to, (iv) detect a connection request from the client for accessing and controlling the service available at the specific virtual machine; and (v) interrogate the connection request to identify the specific virtual machine that provides the service, wherein the service is a virtualized computer service.

15. The image processor algorithm of claim 12, wherein the contiguous areas of activity relate to one or more characteristics of the framebuffer data and wherein the programming logic within the image processor algorithm includes programming logic of a search algorithm that includes, programming logic for tracking presence and location of contiguous areas of activity associated with a specific characteristic within the framebuffer data and ignoring areas of non-activity for the specific characteristic within the framebuffer data.

16. The image processor algorithm of claim 15, wherein the programming logic of the search algorithm further includes, programming logic for tracking presence and location of contiguous areas of activity for a plurality of characteristics and ignoring areas of non-activity for the respective ones of the characteristics of the framebuffer data.

17. The image processor algorithm of claim 15, the programming logic for search algorithm includes programming logic for tuning one or more parameters in order to track presence and location of contiguous areas of activity for the specific characteristic.

18. The image processor algorithm of claim 15, wherein the programming logic for evaluating framebuffer data further includes, programming logic for evaluating portions of the framebuffer data to identify contiguous areas of activity associated with one or more characteristics of the framebuffer data and for generating one or more mini-frames of data for each portion; and programming logic for assembling the mini-frames of data from different portions to define the one or more frames of data that are contiguous, wherein each mini-frame of data identifies contiguous areas of activity for a specific characteristic within a specific portion of the frame buffer data.

19. The image processor algorithm of claim 15, wherein the programming logic within the image processor algorithm further includes, programming logic for obtaining differences related to one or more characteristics of the framebuffer data in areas adjacent to contiguous areas of activity of the framebuffer data, the differences related to each of the characteristics used in determining levels of activity for the respective characteristic within the contiguous areas of activity for generating the frames of data.

20. The image processor algorithm of claim 19, wherein the programming logic within the image processor algorithm is further configured to track the levels of activity related to each of the characteristics within the contiguous areas of activity of framebuffer data, over time, to determine likelihood of persistence of the activity for the respective characteristics within the contiguous areas of activity, the likelihood of persistence used for generating the frames of data for transmission.

* * * * *